United States Patent
Kuriata et al.

(10) Patent No.: US 12,450,008 B2
(45) Date of Patent: Oct. 21, 2025

(54) REMOTE STORAGE FOR HARDWARE MICROSERVICES HOSTED ON XPUs AND SOC-XPU PLATFORMS

(71) Applicant: Intel Corporation, Santa Clara, CA (US)

(72) Inventors: Andrzej Kuriata, Gdansk (PL); Susanne M. Balle, Hudson, NH (US); Duane E. Galbi, Wayland, MA (US); Sundar Nadathur, Cupertino, CA (US); Nagabhushan Chitlur, Portland, OR (US); Francesc Guim Bernat, Barcelona (ES); Alexander Bachmutsky, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 17/558,268

(22) Filed: Dec. 21, 2021

(65) Prior Publication Data
US 2022/0113911 A1    Apr. 14, 2022

(51) Int. Cl.
*G06F 3/06* (2006.01)
*G06F 15/78* (2006.01)

(52) U.S. Cl.
CPC .......... *G06F 3/0659* (2013.01); *G06F 3/0604* (2013.01); *G06F 3/0613* (2013.01); *G06F 3/067* (2013.01); *G06F 15/7807* (2013.01)

(58) Field of Classification Search
CPC .... G06F 3/0659; G06F 3/0604; G06F 3/0613; G06F 3/067; G06F 15/7807;
(Continued)

(56) References Cited

U.S. PATENT DOCUMENTS

2018/0337991 A1* 11/2018 Kumar ................ H04L 41/0897
2019/0073255 A1* 3/2019 Sato ....................... G06F 3/0683
(Continued)

OTHER PUBLICATIONS

Extended European Search Report for Patent Application No. 22203130.4, Mailed May 9, 2023, 9 pages.
(Continued)

*Primary Examiner* — Hosain T Alam
*Assistant Examiner* — Zubair Ahmed
(74) *Attorney, Agent, or Firm* — Compass IP Law PC

(57) ABSTRACT

Methods, apparatus, and software for remote storage of hardware microservices hosted on other processing units (XPUs) and SOC-XPU Platforms. The apparatus may be a platform including a System on Chip (SOC) and an XPU, such as a Field Programmable Gate Array (FPGA). Software, via execution on the SOC, enables the platform to pre-provision storage space on a remote storage node and assign the storage space to the platform, wherein the pre-provisioned storage space includes one or more container images to be implemented as one or more hardware (HW) microservice front-ends. The XPU/FPGA is configured to implement one or more accelerator functions used to accelerate HW microservice backend operations that are off-loaded from the one or more HW microservice front-ends. The platform is also configured to pre-provision a remote storage volume containing worker node components and access and persistently store worker node components.

20 Claims, 12 Drawing Sheets

(58) Field of Classification Search
CPC ....... G06F 2209/5014; G06F 2209/509; G06F 3/0611; G06F 3/0631; G06F 3/0658; G06F 9/5011; G06F 9/5027; G06F 9/5077; G06F 3/0688
USPC ................................................ 711/154, 100
See application file for complete search history.

(56) References Cited

U.S. PATENT DOCUMENTS

| | | | | |
|---|---|---|---|---|
| 2019/0095229 A1* | 3/2019 | Guo | ...................... | G06F 9/4552 |
| 2020/0142735 A1* | 5/2020 | Maciocco | ............. | H04L 9/0825 |
| 2020/0409591 A1* | 12/2020 | Kulli | ..................... | G06F 3/0655 |
| 2021/0286745 A1* | 9/2021 | Smith | ................... | G06F 13/404 |

OTHER PUBLICATIONS

Williams Chris: "Xilinx pops a 16-core 64-bit Arm system-on-chip from NXP into its latest FPGA-based IOOGbps smart NIC—The Register", Mar. 23, 2021 (Mar. 23, 2021), pp. 1-7, XP093042995, Retrieved from the Internet: URL:https://www.theregister.com/2021/02/23/xilinx_snl000_launch/ [retrieved on Apr. 28, 2023].

Xilinx Sn1000: "Product Brief—Alveo(TM) SN1000 SmartNICs", Nov. 24, 2021 (Nov. 24, 2021), pp. 1-2, XP093043010, Retrieved from the Internet:URL:https://web.archive.org/web/20211124214547if_/https://www.xilinx.com/content/dam/xilinx/publications/product-briefs/xilinx-alveo-snl000-product-brief.pdf [retrieved on Apr. 28, 2023].

\* cited by examiner

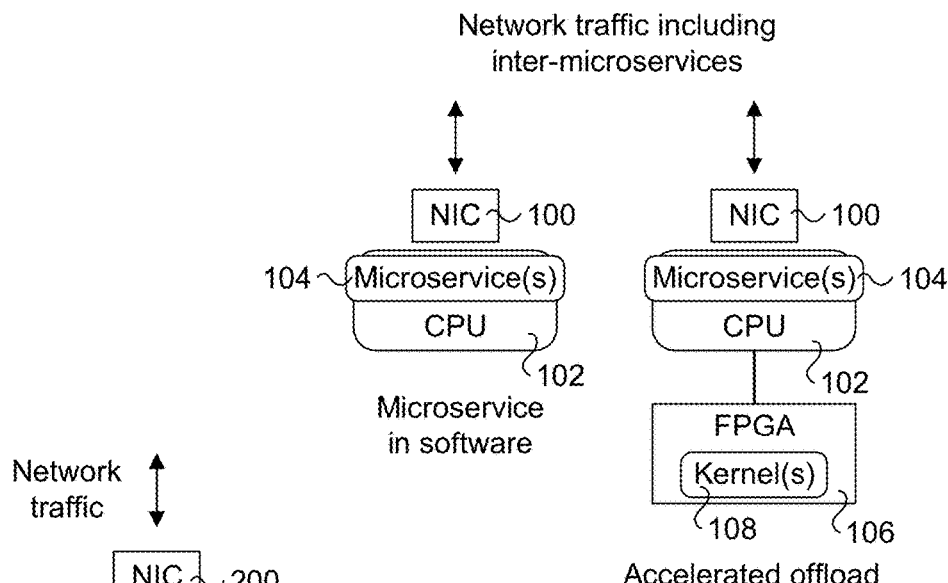
Fig. 1 *(Prior Art)*
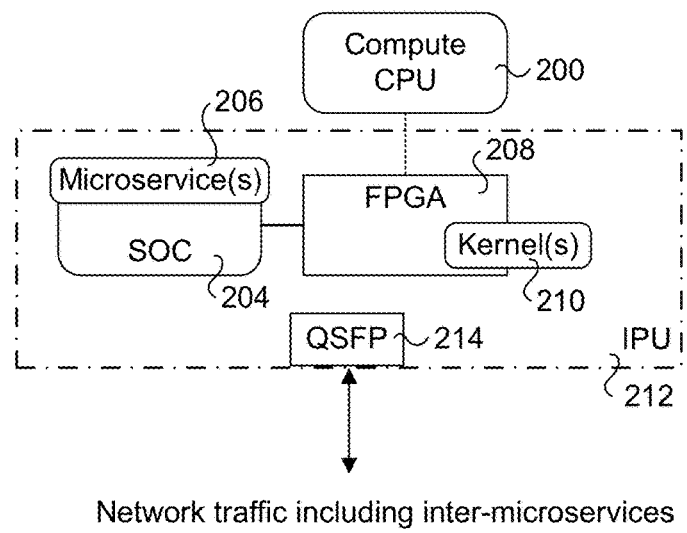

REMOTE STORAGE FOR HARDWARE MICROSERVICES HOSTED ON XPUs AND SOC-XPU PLATFORMS

BACKGROUND INFORMATION

Cloud Service Providers (CSPs) are shifting towards applications composed of graphs of hundreds of loosely coupled microservices and accelerating microservices such as Inference, network processing, compression, in search kernels in Field Programmable Gate Arrays (FPGAs), Application Specific Integrated Circuits (ASICs), and other accelerator devices. Examples of such applications include Inference with Brainwave (Microsoft), Warehouse-Scale Video Acceleration (Google, ASPLOS '21), etc.

Offloading workloads to accelerators is desirable for multiple reasons, including the potential for acceleration, offloading frees up the CPU (Central Processing Unit), and offloading provides security and ownership/control separation as opposed to even dedicated infrastructure CPU cores that in many cases still share some resources with the application cores. Current trends are to do workload and infrastructure acceleration in the other processing units, collectively referred to as XPUs. Generally, XPUs include but are not limited to one or more of Graphic Processor Units (GPUs) and General Purpose GPUs (GP-GPUs), Tensor Processing Units (TPUs), Data Processor Units (DPUs), Artificial Intelligence (AI) processors and AI inference units and/or other accelerators, ASICS, FPGAs, and/or other programmable logic (used for accelerator/compute purposes), etc.

As used herein, a hardware (HW) microservice is defined as a combination of Front-End (FE) component and Back-End (BE) component. The Front-End is responsible for exposing XPU-accelerated service in a Cloud Native environment, such as Kubernetes. The processing of user requests for which acceleration is implemented (e.g., file compression/decompression, encryption/decryption, etc. or) is handled by the Back-End. This predominates the HW microservice deployment. Under some embodiments, The Front-End is deployed on the System-on-Chip (SoC) adjacent to an XPU (e.g., an FPGA), and Back-End is deployed on the FPGA itself.

The storage on the SoC-XPU platform is constrained and expensive. Generally, this storage cannot be easily extended compared to a typical server where additional persistent storage can be attached (e.g., using PCIe (Peripheral Component Interconnect Express) or NVMe (Non-Volatile Memory Express) interfaces).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1 is a diagram illustrating conventional implementation of microservices using software and using a combination of software and a portion of the microservice workload offloaded to an accelerator comprising an FPGA;

FIG. 2a is a diagram illustrating a first HW microservice use case in which one or more software microservices are executed on a System on Chip (SOC) and a portion of the microservice workload is offloaded as a HW microservice implemented in a kernel of an FPGA;

FIG. 2b is a diagram illustrating a second HW microservice use case in which the SOC and FPGA are implemented in an IPU;

DETAILED DESCRIPTION

Figure 3:
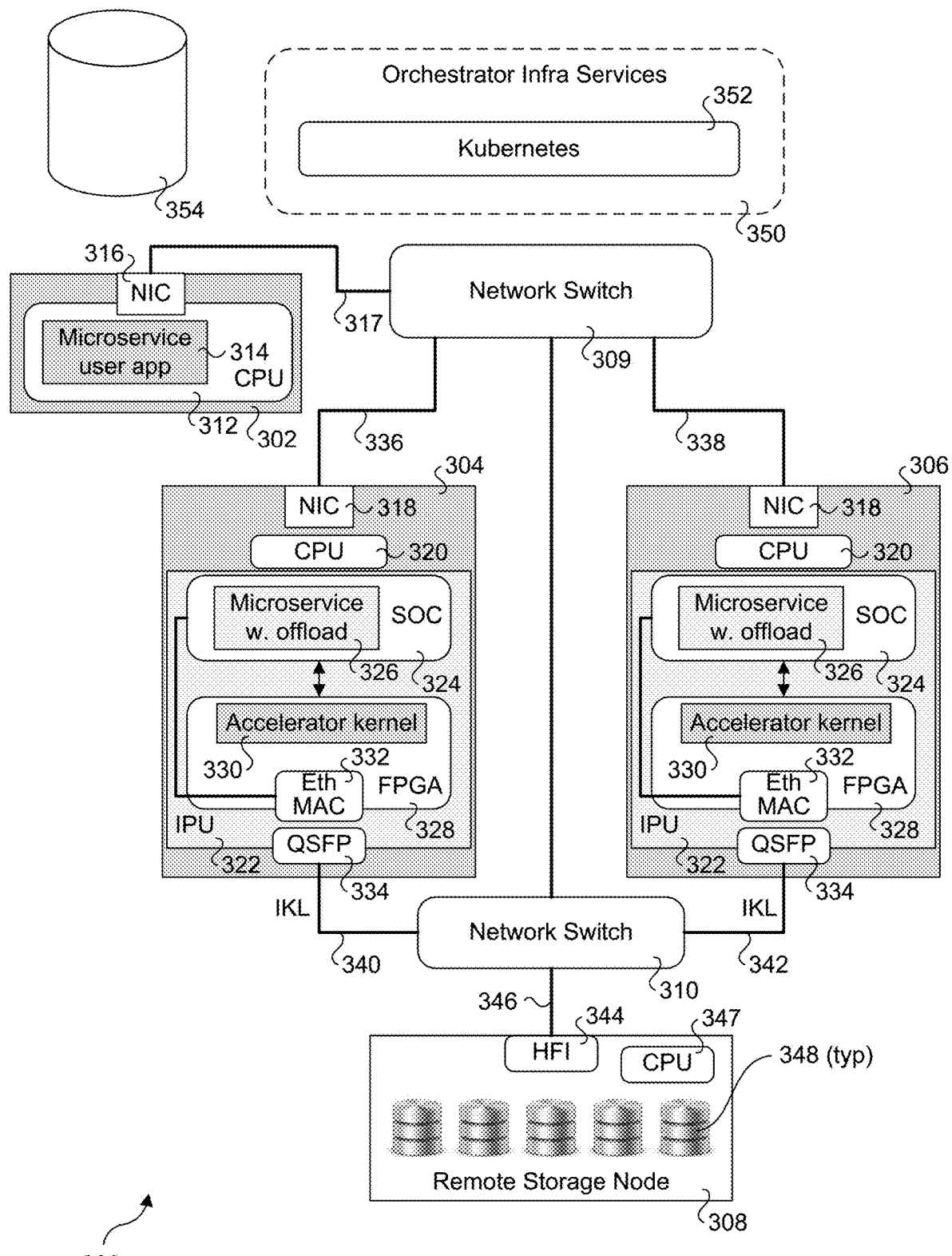
FIG. 3 is a diagram illustrating an exemplary environment including a pair of servers on which HW microservices are implemented.

Embodiments of methods, apparatus, and software for remote storage of hardware microservices hosted on XPUs and SOC-XPU Platforms are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Microservices (or microservices architecture) are a cloud native architectural approach in which a single application is composed of many independently deployable smaller components, or services. These services may have their own technology stack and generally communicate with one another over a combination of REST/RESTful APIs (Application Program Interfaces), event streaming, and message brokers.

Historically, microservices have been deployed entirely in software as a distributed set of processes running on virtual machines or containers using host platforms (e.g., servers) that are interconnected via networks in environments such as data centers and the like. While microservices may be deployed using various software frameworks and architectures, one or the more popular frameworks is Kubernetes®, which supports scalability and resiliency, among other features.

Customers of a managed Kubernetes® service care about microservices from functionality/performance and SLA (Service Level Agreement) point of view, so hardware (HW) microservices in many cases cannot only provide the answer for those requirements, but even improve the overall system behavior. Generally, HW microservices are optimized accelerated functions/kernels for XPUs/FPGAs provided in a repository or pre-deployed into the cloud that the customers can use in their microservice application to get optimized version of kernels.

Today, microservice offload acceleration in an XPU is defined from a resource point of view as requiring a server with two types of resources, CPU and XPU connected through PCIe (Peripheral Component Interconnect Express), hosted in traditional servers. With the emergence of disaggregated data center architectures this is no longer the right approach and this approach needs to be redefined.

In traditional datacenters, microservices are running on CPUs and when acceleration offload is performed it is done using a PCIe Accelerator cards enabling the kernels to be accelerated while still using the traditional compute CPU to run the software logic in the microservice server to program, to manage, and to interact with offloaded accelerated functions in the XPU. An example of this use case is shown in FIG. 1.

The left side of FIG. 1 shows a conventional approach under which microservices are implemented in entirely in software. The hardware components to facilitate this include a Network Interface Controller (NIC) 100 coupled to a CPU 102 on which microservices 104 are run. The use of software microservices in datacenters has seen substantial growth in the past decade. Traditionally, software microservices are implemented via distributed processes employing, e.g., RESTful interfaces, where a process executes a dedicated service (called a microservice). When married with high-bandwidth networking and virtualized environments, including those using virtual machines (VMs) and container-based deployments, such as Kubernetes, software microservices provide enhanced performance and scalability when compared to conventional software architectures. At the same time, software microservices are still CPU-bound—that is, all microservice workloads are performed via execution of software on CPUs.

In general, a hardware microservice is a microservice utilizing acceleration offload into an XPU. Examples of HW microservices use cases are network processing, compression, inference, etc. Because of the complexity of HW microservices, these are usually a combination of a server (front-end) and of an accelerated kernel (backend) performing the compute intensive tasks. Generally, in some embodiments the inter-node HW microservices network traffic does not go through a network interface, such as a NIC, but rather is directly between FPGAs when using SOC+XPU cards. Optionally, HW microservice may be deployed into the IPU in which case the inter-node HW microservices network traffic is inter-IPU and does employ network interfaces on the IPUs.

An example of a conventional approach for implementing a HW microservice is shown on the right side of FIG. 1, which depicts offloading of microservice(s) workload(s) to an accelerator comprising an FPGA 106. One or more kernels 108 are programmed in FPGA 106, where kernels 108 are used to execute HW microservice(s) in hardware. As discussed above, under a common approach FPGA 106 would be implemented in a PCIe accelerator card or the like.

In today's composable datacenters, an orchestrator composes logical servers from resources on sleds (including headless sleds) which are managed and hosted by an IPU that also enforces their use. As used herein, the term "IPU" refers to an infrastructure Processing Unit, which may take different forms (such as examples described and illustrated herein) and provide facilities for hardware-based acceleration services as well as memory, storage, and networking functions. Hardware microservices in the IPU are used for infrastructure acceleration.

With the emergence of the IPU and of standalone "SOC (System On Chip)+XPUs" and "SOC+ASIC+XPU" platforms/cards such as Intel® FPGA Oak Spring Canyon and Big Spring Canyon cards, Nvidia® Bluefield, Fungible and Pensando Data Processing Unit (DPU), IPUs, etc., a new use case is emerging with a need to deploy accelerated microservices onto "SOC+XPU" platforms/cards in their own security domain, efficiently and at scale.

Under these emerging platforms/cards, the HW microservice is composed of a software microservice server (application and control logic software, e.g., server) running on small SOC or ASIC such as an Intel® Xeon-D®, ARM®-based SOC, RISC-based SOC, and of an XPU optimized accelerated function (kernel). Hardware microservices are ideal for accelerated microservices using a combination of SOC+XPU and SOC+ASIC+XPU.

FIGS. 2a and 2b show examples of HW microservices in FPGAs using these emerging platform architectures. The components illustrated in FIG. 2a include a NIC 200, a compute CPU 202, an SOC 204 on which microservices 206 are run, and an FPGA 208 in which one or more kernels 210 are programmed and executed. As shown in FIG. 2b, SOC 204, microservices 206, FPGA 208 and kernels 210 are implemented in an IPU 212. The IPU further includes a QSFP network interface 214. QSFP (Quad Small Form factor Pluggable), is a compact, hot-pluggable network interface module used for both telecommunication and data communications applications. Different QSFP modules supports Ethernet, Fibre Channel, InfiniBand and SONET/SDH standards with different data rate options over physical media including optical fiber and copper cables.

In the HW microservices use cases in FIGS. 1, 2a, and 2b, the "SOC+XPU" and IPU can be set up in its own security domain so that the main compute CPU is in a separate domain allowing CSPs to rent the main CPU out to developers (VM, containers, baremetal server, etc.) while also offering pre-deployed or on-demand HW microservices of highly optimized XPU kernel with a flexible standard interface to microservice developers looking at replacing their home-written algorithm with an highly optimized kernel. In the case of infrastructure acceleration, hardware microservices would be deployed and used to accelerate components in the management stack such as for example gRPC or any networking processing acceleration needed.

FIG. 3 shows an environment 300 including servers 302, 304, and 306 and a remote storage node 308 is coupled in communication via network switches 309 and 310. Server 302 includes a CPU 312 on which a microservice user application 314 is executed, along with a NIC 316 coupled to switch 309 via a network link 317. Servers 304 and 306 have similar configuration, with each server including a NIC 318, a CPU 320, and an IPU 322. IPU 322, which in one embodiment comprises an PCIe board installed in an PCIe expansion slot, includes an SOC 324 on which a microservice with offload 326 is executed, and an FPGA 328 that is programmed to implement an accelerator kernel 330 and configured to implement an Ethernet MAC block 332. IPU 322 further includes a QSFP module 334 comprising a network interface.

NICs 318 on servers 304 and 306 are respectively connected to network switch 309 via links 336 and 338. QSFP module 334 on server 304 is connected to network switch 310 via a network link 340, while QSFP module 334 on server 306 is connected to network switch 310 via a network link 342. In one exemplary and non-limiting embodiment, links 317, 336, 338, 340, and 342 are Ethernet links, such as high-speed Ethernet links have a bandwidth of 50 Gigabits per second (Gb/s) or higher. In one embodiment, all or a portion of links 317, 336, 338, 340, and 342 are implemented using a fiber media (e.g., optical cables). Optionally, copper cabling may be used for all or a portion of links 336, 338, 340, and 342.

Generally, the links and switches may be referred to in the art as a fabric or network, and these terms are used interchangeably herein. A fabric may also be referred to as a switch fabric in the art. As such, reference to "network switch" here also may apply to a "fabric switch," as will be recognized by those skilled in the art.

In one embodiment, links 340 and 342 implement an Inter-Kernel Links (IKL) protocol, which is low latency and high bandwidth streaming protocol and architecture with built-in reliability and control flow for direct inter-FPGA communication. IKL was introduced in Balle, S. M., Tetreault, M., & Dicecco, R. *Inter-Kernel Links for Direct Inter-FPGA Communication*. Using IKL, developers can design applications in OpenCL™, high-level synthesis (HLS), or register transfer level (RTL) that use direct inter-FPGA communication using FPGA Programmable Acceleration Cards (e.g., Intel® FPGA PACs) and IPUs such as described and illustrated herein. Users can pipeline tasks within an application to run on multiple FPGAs as well as partition their designs between FPGAs, thereby increasing their overall available resources. IKL can also be used for Inter-Kernel communication between other types of accelerators employing Kernel communication, such as GPUs, and Vector Processing Units (VPUs), as well as other XPUs.

Server 302 may generally comprise a conventional server used in data centers that may be packaged using various form factors, such as, but not limited to a 1 U or 2 U server, a server blade or server module, or a server board deployed in a server sled or the like. Server 302 is used to execute (primarily) CPU-bound workloads using application running on a host operating system, one a Guest/VM, or in a container. For example, the software architecture for server 302 may include a "bare metal" Type-1 hypervisor, a Virtual Machine Manager (VMM) or Type-2 hypervisor, or a container-based architecture, such as but not limited to Docker® style containers. In some embodiments, the software architecture on server 302 employs Kubernetes® pods, as described in further detail below.

Servers 304 and 306 are used to implement workload employing offloaded HW microservices. In some embodiments, a small portion the compute cycles of CPU 320 is used to perform management operations relating to operations performed by IPUs 322, with the remaining compute resources for CPU 320 used to how software-based workloads. For example, a CSP or the like may lease CPU resources provided by CPU 320 to one or more tenants. In another embodiment (not shown), servers 304 are "headless" servers.

Remote storage node 308 includes a host fabric interface 344 coupled to network switch 310 via a fabric link 346, a CPU 347, and multiple storage devices 348. In one embodiment storage devices 348 comprise storage class memory (SCM); more generally, storage devices 346 may comprise any form of non-volatile storage, including but not limited to solid-state non-volatile memory, optical drives, and magnetic disk drives. SCM combines the benefits of a solid-state memory, such as high performance and robustness, with the archival capabilities and low cost of conventional hard-disk magnetic storage. SCM is a new hybrid storage/memory tier with unique characteristics. Physically, it connects to memory slots in a system board, such as standard DIMM (Dual Inline Memory Module) slots, like traditional DRAM. While SCM is slightly slower than DRAM, it is persistent, meaning that, like traditional storage, its content is preserved during a power cycle. Compared to flash, SCM is orders of magnitude faster, providing performance gains on both read and write operations. It has another benefit over flash as well—SCM tiers are significantly more resilient, not suffering from the wear that flash falls victim to.

Generally, SCM can be addressed at either the byte or block level, depending on the particular implementation. This gives operating systems, software and hypervisor developers significant flexibility regarding the medium's applications. For example, it's conceivable that operating systems will initially treat SCM as block storage devices formatted by file systems and databases for compatibility purposes. However, next-generation applications may choose to access SCM directly via memory-mapped files using byte-level addressing. Hypervisors and virtualization layers can abstract and present isolated SCM regions directly to different VMs as either execution memory or a flash-like storage resource.

Environment 300 further includes orchestrator infrastructure services 350 including a Kubernetes® module 352. Environment 300 also implements one or more forms of data storage 354. Generally, data storage 354 may represent various types of data storage devices and/or architecture, including local data storage, a storage pool or the like in a disaggregated data center environment, or a storage layer provided by a Storage as a Service (STaaS) CSP such as but not limited to AWS S3 and AWS xFS, Google Cloud Storage, IBM STaaS, Oracle Cloud Storage, Dropbox, Box Cloud Storage, etc.

HW Microservices Driven Multiplexing on Accelerated Kernels in XPUs

In accordance with some aspects, HW micro-services are enabled with "smart" multiplexing of the XPU or XPUs for offload. A novel way of optimizing "sharing" of the XPU between multiple microservices has been developed, where the sharing and management of XPUs is triggered by the running microservices themselves and not ahead of time by the orchestrator allocating static FPGA slots or resources to a given application. The focus on both microservices applications and infrastructure and the introduction of SOC+FPGAs such as Big Spring Canyon, enables us to innovate around a third acceleration use case that combine the previously mentioned use cases; at the same time, similar concepts apply to non-FPGA implementations, as well. The solutions address deploying and managing HW microservices running on the SOC of the SOC+FPGA and offloading into the accelerator FPGA while also taking advantage of the built-in storage and networking support. This enables creation of a novel, optimized, and secure architecture for HW microservices that can be leveraged by datacenter owners to offer their customers a service encapsulating proprietary IP (Intellectual Property).

Figure 4:
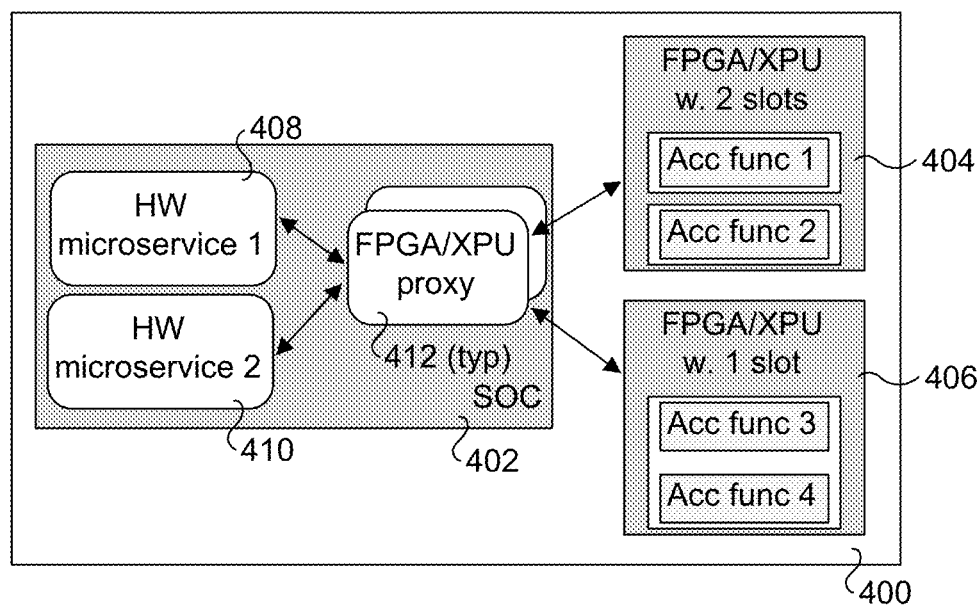
FIG. 4 is a diagram illustrating a platform implementing a pair of HW microservices and including accelerator functions implemented in a pair of FPGAs or XPUs.
Figure 5:
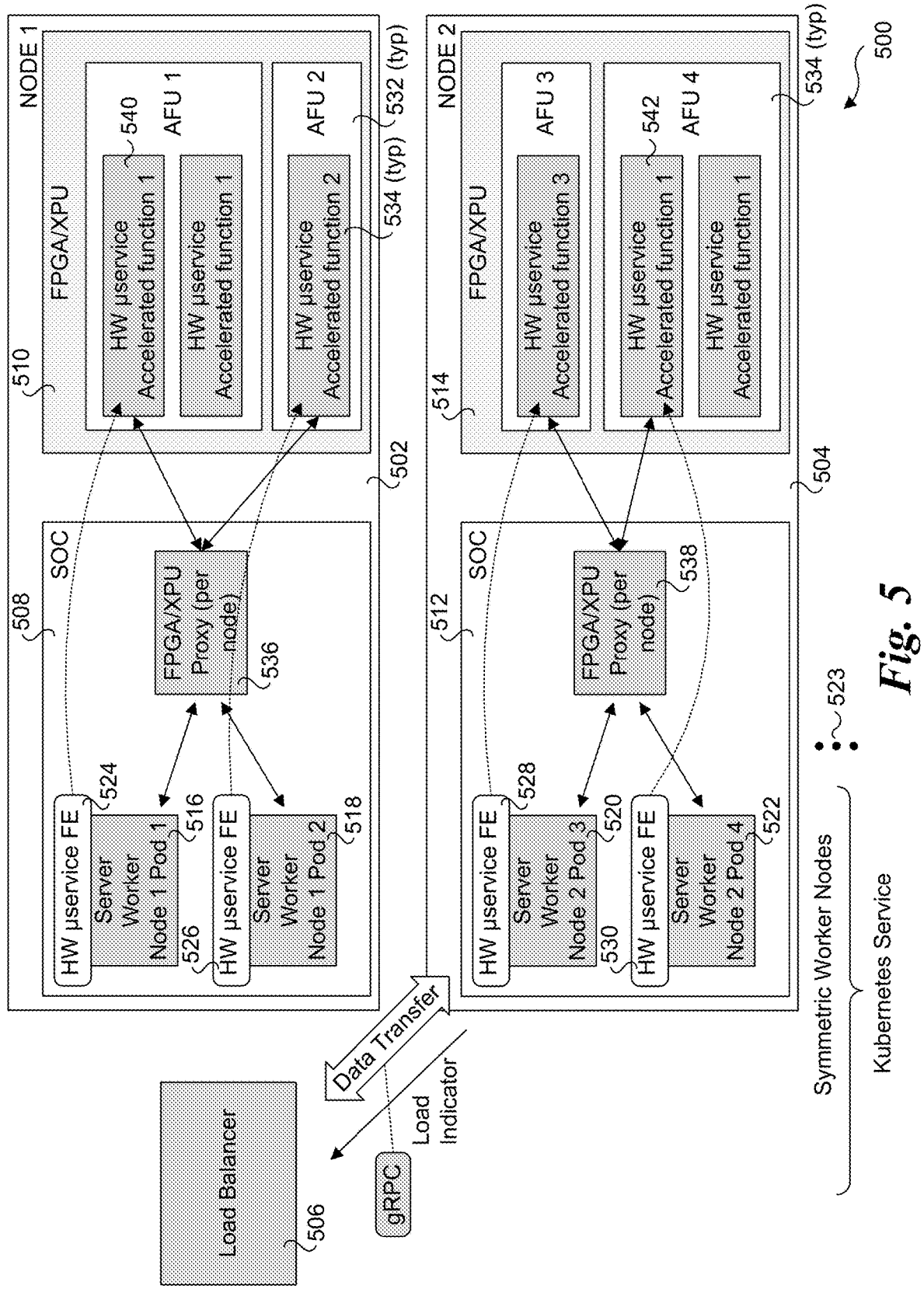
FIG. 5 is a diagram illustrating a deployment of HW microservices using Kubernetes pods.

FIGS. 4 and 5 shows some additional use cases. Platform 400 in FIG. 4 includes an SOC 402, an FPGA/XPU 404, and an FPGA/XPU 406 with one slot. SOC 402 is used to implement HW microservices 408 and 410 (also labeled HW microservice 1 and HW microservice 2) and FPGA/XPU proxies 412, which support communication between HW microservices 408 and 410 and FPGA/XPU 404 and FPGA/XPU 406. The 2 slots in FPGA/XPU 404 are used to implement respective accelerator functions 1 and 2. The single slot of FPGA/XPU 406 is used to implement accelerator functions 3 and 4.

FIG. 5 shows an environment 500 including a pair of nodes 502 and 504 (also labeled NODE 1 and NODE 2) and a load balancer 506. Node 502 comprises a platform including an SOC 508 communicatively coupled to an FPGA/XPU 510, both of which are mounted or otherwise operatively coupled to the platform's circuit board. Similarly, node 504 comprises a platform including an SOC 512 communicatively coupled to an FPGA/XPU 514. Generally, nodes 502 and 504 may be deployed in the same server or in separate servers, including "headless" servers. For example, in some embodiments a node is a platform comprising a PCIe card that is installed in a PCIe expansion slot in a server. Such servers may have multiple PCIe expansion slots, thus a single server may include a single node or multiple nodes.

Generally, load balancer 506 may be implemented as software executing on a host CPU in a server. In some embodiments, a single load balancer may be used for multiple nodes, including nodes on separate servers. In other embodiments, each server has its own load balancer. In the illustrated embodiment, load balancer 506 transfers data (both send and receive) using gRPC calls. gRPC is an open-source high performance RPC (remote procedure call) framework initially developed at Google. It uses HTTP/2 for transport, Protocol Buffers as the interface description language, and is commonly used for connecting services in microservices style architecture. It can efficiently connect services in and across data centers with pluggable support for load balancing, tracing, health checking and authentication. Other embodiments may employ communication protocols other than gRPC, as the use of gRPC is merely exemplary and non-limiting.

Nodes 502 and 504 employ multiple symmetric worker nodes on which Kubernetes services are deployed Kubernetes containers. Under Kubernetes nomenclature, a Kubernetes pod is a group of containers that are deployed together on the same host, (e.g., the same physical server, same IPU, same node, etc.). A pod is the basic execution unit of a Kubernetes application and represents processes running on the clusters. A pod encapsulates an application's container (or multiple containers), storage resources, a unique network IP, and options that govern how the container(s) should run. A pod represents a unit of deployment: a single instance of an application in Kubernetes, which might consist of either a single container or a small number of containers that are tightly coupled and that share resources.

As shown in FIG. 5, a pair of server worker node pods 516 and 518 are deployed on node 502. Similarly, a pair of server worker node pods 520 and 522 are deployed on node 504. Additional server worker node pods may be deployed on similar nodes, as represented by ellipses 523.

Each server worker node pod is used to run one or more instances of a HW microservice front-end (FE), as illustrated by HW microservice FEs 524, 526, 528, and 530. Each of the HW microservice FEs operates as a front-end microservice server that utilizes an accelerated HW microservice backend. The accelerated HW microservice backends are implemented using Accelerator Functional Units (AFUs) 532 in FPGA/XPUs 510 and 514. Each AFU 532 is used to implement a given type of HW accelerated function, where an AFU may support one or more instances of the accelerated function. The HW accelerated functions are depicted by HW microservice accelerated functions 534 in FIG. 5, which are also labeled HW microservice accelerated functions 1, 2, and 3. As further shown, An FPGA/XPU proxy 536 is deployed via execution of an associated proxy service on SOC 508, while an FPGA/XPU proxy 538 is deployed via execution of an associated proxy service on SOC 512. The HW microservice FEs 524 and 526 (running on server worker node pods 516 and 518) tell FPGA/XPU proxy 536 (or the latter predicts based on incoming metrics, as discussed below)) to provision and/or reprovision the accelerated functions from an available datacenter-wide or local repository to make the FPGA or other type of XPU take on a new personality or personalities to meet the microservices' SLO. Any combination of multiple HW microservices (front ends) to one or more FPGA/XPU accelerated functions/slots may be supported. FPGA/XPU proxy 536 enables HW microservice FEs 524 and 526 to multiplex FPGA/XPU 510 between different predetermined applications. Similarly, FPGA/XPU proxy 538 enables HW microservice FEs 528 and 530 to multiplex FPGA/XPU 510 between different predetermined applications.

As shown in FIG. 5, a first instance 540 of HW microservice accelerated function 1 in AFU 1 is allocated by FPGA/XPU proxy 536 to HW microservice FE 524, while HW microservice accelerated function 2 in AFU 2 is allocated to HW microservice FE 526. Also, FPGA/XPU proxy 538 allocates HW microservice accelerated function 3 in APU 3 to HW microservice FE 528 and allocates a first instance 542 of HW microservice accelerated function 1 in APU 4 to HW microservice FE 530. The term allocate here indicates the FPGA/XPU proxies 536 and 538 provide multiplexed access to the HW microservice accelerated functions, as these functions may be shared with other HW microservice FEs running on the same or other nodes.

In one embodiment, the HW microservice FEs and the accelerated functions provide telemetry and other feedback to FPGA/XPU proxies 536 and 538. For example, 1) acceleration function A's suitability for a given HW microservices; 2) bitstream A and B placements optimization when sharing of a single slot; or 3) available FPGA PE/resources.

In one embodiment, an FPGA/XPU proxy may implement ICN/CCN/NDN (Information Centric Network/Content Centric Network/Named Data Networking) or similar dynamic service discovery and translate it into the set of required resources and their availability on any node, and acknowledge the acceptance of service request in the case when it can be performed. The FPGA/XPU proxy may start preparing and provisioning resources for a new service (like loading required firmware/software, etc.) even before receiving the actual service request, which will save time if it is selected for the service.

With knowledge of specific acceleration functions, the FPGA/XPU proxy predicts, programs, and schedules the FPGA or XPU based on pre-existing characteristics of the functions and feedback from the microservice front ends. The FPGA/XPU proxy inspects requests (e.g., packet inspection) from a client or microservice "client" and determines an optimal processing entity (software, XPU, ASIC) for the HW microservices based on monitored performance telemetry and health to meet.

The FPGA/XPU can interact with the HW microservices to understand accelerated function requirements and manage incoming traffic requests meant for the FPGA or XPU. This interaction can be performed along with doing, for example, packet inspection to understand the packet type and forward it to the appropriate accelerated functions based on the latter's KPIs (Key Performance Indicators). The FPGA/XPU proxy also monitors, manages, and allocates/deallocates accelerated functions in the FPGA/XPU.

In some embodiments, the FPGA/XPU can also perform security attestation of HW microservices and establishes/manages security domains across software and HW microservices. It includes transport security, processing domains separation, network virtualization, enforcement of Trusted Execution Environment configurations (for instance, memory or bus encryption within HW microservices). If we look at a set of network-connected nodes each one having its own subset of HW and SW microservices, this set (referred to as a virtual pod) creates a network of proxies, each one responsible for security of its own node and all together create the end-to-end security domain. Such proxies securely communicate with each other to share information about their own node status, capacities, capabilities and security information and also enable securely passing HW microservices input and output information for service chain scenarios.

The FPGA/XPU proxy predicts HW microservices future behaviors based on microservice and accelerated functions' telemetry and feedback to meet the microservices' service level objective (SLO) including personality change of FPGA or XPU. It may also be used to select an accelerated function or a mix thereof to support better throughput of the incoming traffic, e.g., if the amount of compression requests coming is low but encryption requests are high, the hardware microservice server can tell the FPGA/XPU proxy or the FPGA/XPU proxy can predicts based on this information to reprogram one or more of the FPGA slots with the encryption kernel to support the throughput as well as SLA/SLO for that HW microservice.

In one embodiment, the FPGA/XPU proxy provides the capability to select partial acceleration vs full acceleration. For example, some algorithms can be split across SW and HW microservices with heavy processing being performed in HW and the remaining part performed in software. Such option is communicated to the service initiator, and the resulting split between HW and SW is negotiated on behalf of the HW microservices.

This applies to other XPUs as well such as virtual XPUs (vXPUs). A vXPU is a unit of XPU that is enabled to be shared among multiple microservices. In the case where the XPU is an FPGA the hardware microservices can perform partial reconfiguration to update the kernels in the slots or in the AFU without affecting the other running kernels or the network traffic.

The FPGA/XPU proxy may also provide feedback to the HW microservices so they can better choose a HW or SW options and perhaps even have the FPGA/XPU proxy choose a software solution, as well.

Figure 6:
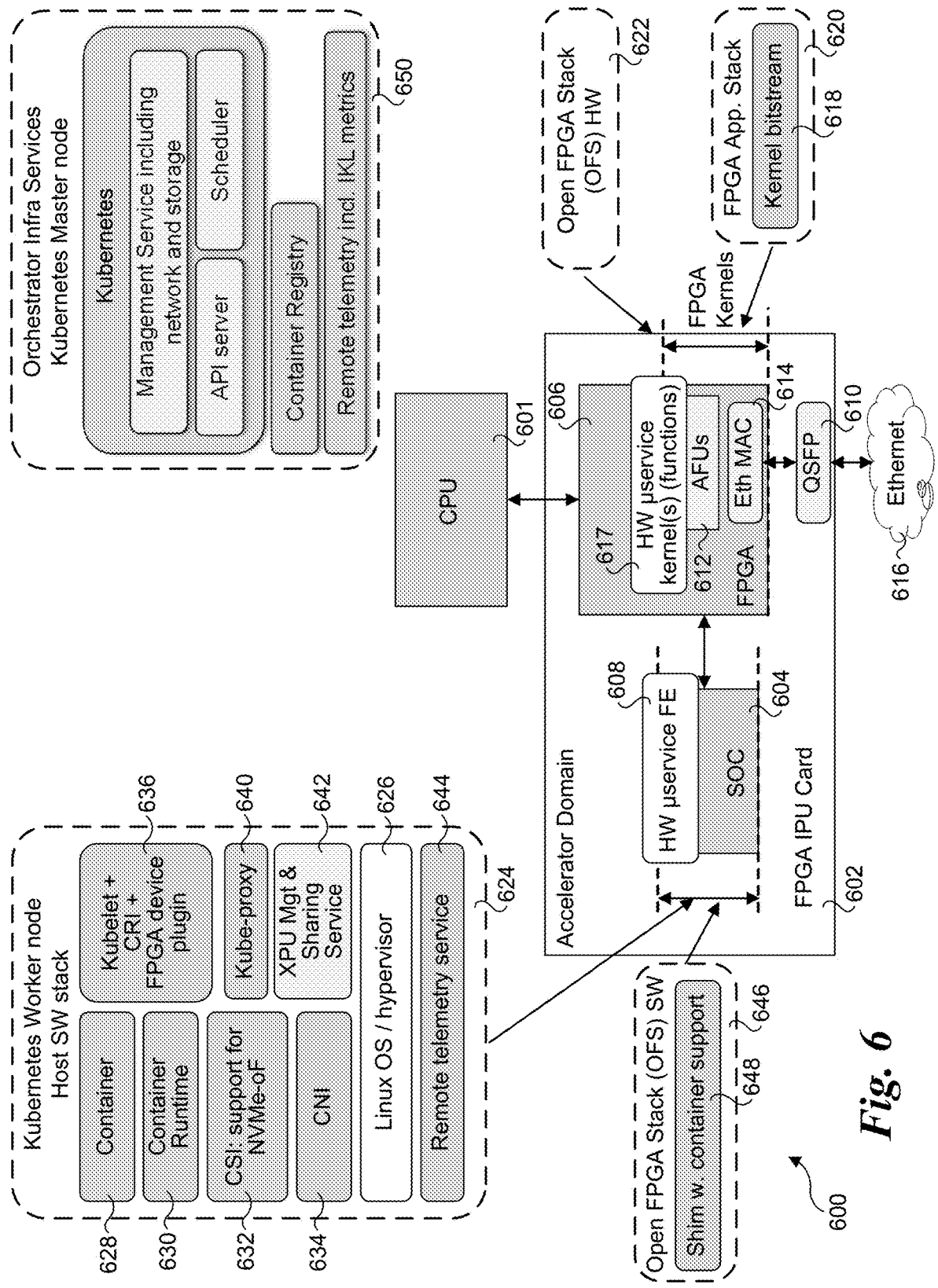
FIG. 6 is a diagram illustrating a first example of a HW microservice architecture using SOC and an FPGA.

FIG. 6 shows an example of a HW microservice architecture 600 using SOC+FPGA. A similar architecture may apply to SOC+XPU (where the XPU is not an FGPA). A CPU 601 is coupled to an FPGA IPU card 602 including an SOC 604, an FPGA 606, and one or more QSFP modules 610. In one embodiment the FPGA IPU card is a PCIe card installed in a PCIe expansion slot of a server including CPU 601, where CPU 601 and FPGA 606 communicate using PCIe (e.g., PCIe transaction layer packets (TLPs)). A HW microservice front-end (FE) 608 comprising software runs on SOC 604, while FPGA 606 includes one or more acceleration function units (AFUs) 612 that are used to implement HW microservice kernels. FPGA 606 further includes an Ethernet MAC block 614 that is coupled to the one or more QSFP modules 610, which in turn are coupled to an Ethernet network 616.

The HW microservice kernel(s) 617 are microservice functions programmed in AFUs 612 using an FPGA kernel bitstream(s), as depicted by a kernel bitstream 618 in FPGA application stack 620. FPGA 606 also implements the hardware components of an Intel® Open FPGA Stack (OFS) 622. OFS is a scalable, source-accessible hardware and software infrastructure delivered via git repositories that enables users to customize acceleration platform solutions.

SOC 604 is used to host execution of Kubernetes worker node software, as depicted by Kubernetes worker node host SW stack 624. These include conventional Kubernetes® software components that are deployed in a Kubernetes® pod, plus additional software components.

Kubernetes® is deployed using a Linux OS/hypervisor 626, and includes a container module 628 and a container runtime 630. CSI (Container Storage Interface) 632 is configured to support the NVMe-oF (Non-Volatile Memory Express over Fabric) protocol in the illustrated embodiment. NVMe-oF enables NVMe drives that are remote to be accessed over a fiber network. CNI (Computer Networking Interface) 634 is a plug-in used to assign IP addresses and facilitate communication with other Pods.

The components in Kubelet+CRI+FPGA device plugin block 636 are Kubernetes® components. The Kubelet is the primary "node agent" that runs on each node. It can register the node with the API server using one of: the hostname; a flag to override the hostname; or specific logic for a cloud provider. The Kubelet works in terms of a PodSpec. A PodSpec is a YAML or JSON object that describes a pod. CRI stands for Container Runtime Interface in Kubernetes. As part of the effort to make Kubernetes more extensible, the community has been working on a new plugin API for container runtimes in Kubernetes, called "CRI". FPGA device plugin is responsible for discovering and reporting FPGA devices to the Kubelet. During the allocation phase, it instructs the Kubelet about device nodes to be accessed by the container and sets the annotation that is later on passed to CRI to trigger programming by the CRI-O hook.

Kube-proxy 640 is the standard Kubernetes® proxy. XPU management and sharing service 626 is used to implement the FPGA/XPU proxy functionality described and illustrated herein. Remote telemetry service 644 is used to provide telemetry data to a remote entity, such as an orchestrator.

SOC 604 is also used to execute OFS software 646 including a shim with container support 648. In one embodiment, OFS software 646 represents the software components in the Intel® Open FPGA Stack. The use of OFS is merely exemplary and non-limiting, as other FPGA software may also be used.

HW microservice architecture 600 further depicts an orchestrator infrastructure services Kubernetes master node 650. This represents Kubernetes software implemented in by an orchestrator node that is used to manage infrastructure services across the deployment environment, such as in a data center.

Figure 7:
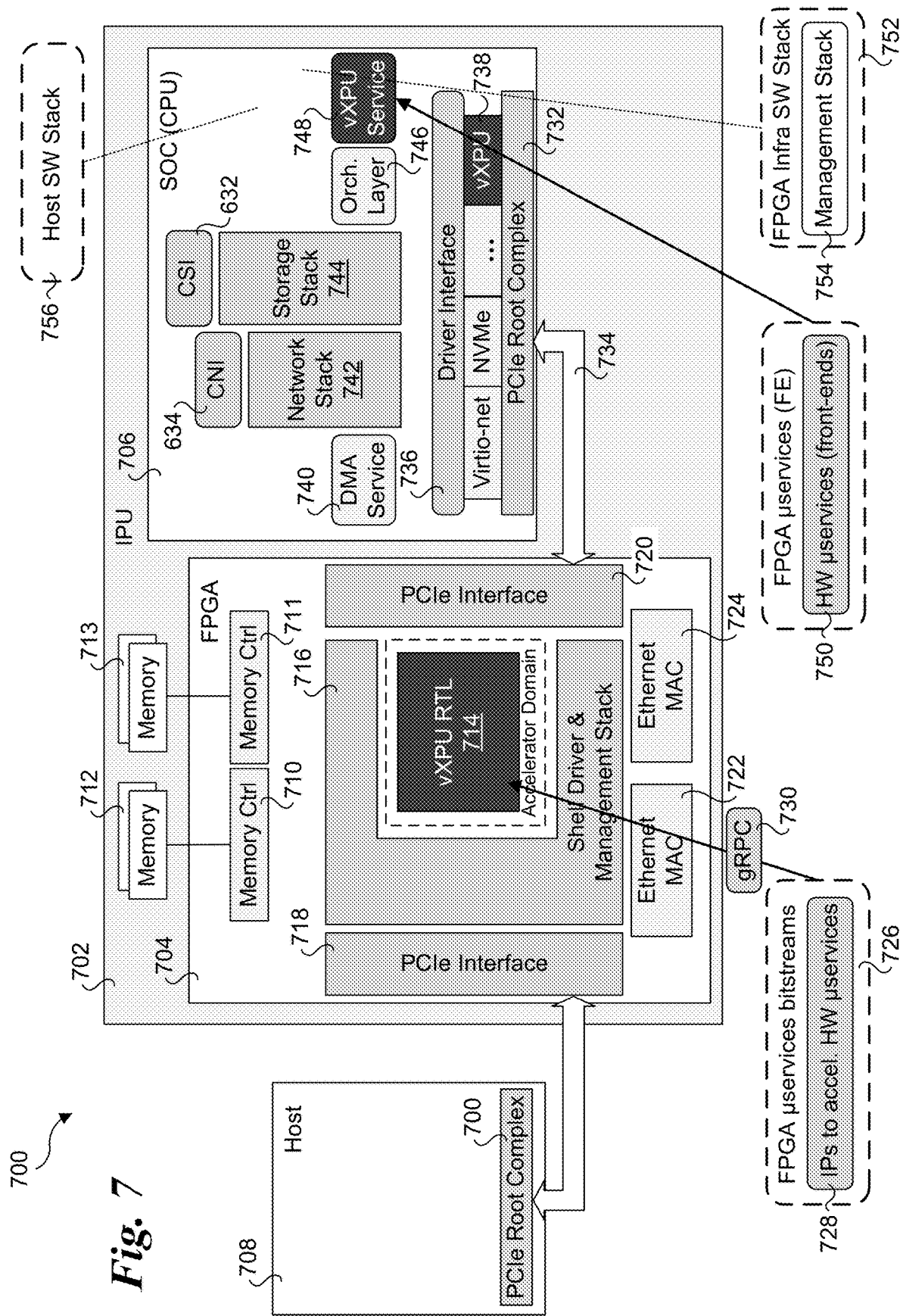
FIG. 7 is a diagram illustrating a second example of a HW microservice architecture using SOC and an FPGA.

FIG. 7 shows a HW microservice architecture 700 on a platform employing an SOC and FPGA. The top-level components of comprise a platform comprising an IPU 702 including an FPGA 704 and an SOC 706, and an abstracted view of a host 708. FPGA 704 includes one or more integrated memory controllers coupled to one or more memory devices that are on the IPU board and external to FPGA 704. For example, the illustrated embodiment shows a pair of memory controllers 710 and 711 coupled to memory devices 712 and 713. FPGA 704 also includes a vXPU RTL block 714, a shell driver and management stack 716, PCIe interfaces 718 and 720, and Ethernet MAC blocks 722 and 724. Shell driver and management stack 716 include IP blocks that interface with software drivers and management components on SOC 706. For example, the IP blocks may include a Virtio DMA (Direct Memory Access) block, and an NVMe (Non-volatile Memory Express (NVMe®)) block, and an Open vSwitch block, in one embodiment.

vXPU RTL block 714 is programmed with FPGA microservices bitstreams 726 including IPs to accelerator HW microservices 728. In the illustrated embodiment, gRPC calls 730 are used for streaming FPGA microservices bitstreams 726 to FPGA 704.

SOC 706 is illustrative of the SOC components described and illustrated herein. In some embodiments, and SOC is a CPU employing an SOC architecture. For example, SOC 706 may comprise an Intel® Xeon-D® CPU/SOC, an ARM®-based CPU/SOC, or a RISC-based CPU/SOC (e.g., RISC-V). The SOC will include one or more cores for executing software components; for illustrative purposes, the cores are not shown in the SOCs herein as one having skill in the art would recognize such one or more cores would be present. In addition, an SOC would include various other components and interconnect circuitry, including caches, I/O (input/output) interconnects, power control blocks, etc. Part of the I/O circuitry includes a PCIe root complex 732 that would include a PCIe root port or other PCIe interface (not separately shown) connected to PCIe interface 720 over a PCIe link 734.

SOC 706 depicts selected software components that are executed on the one or more cores. These include a driver interface 736 that operates as an interface between various drivers and software implemented in layers above the driver interface layer. Exemplary drivers include a vXPU driver 738, a Virtio-net driver, and an NVMe driver. The drivers are used to provide and interface to corresponding hardware IP blocks on FPGA 704, such as vXPU RTL block 714 and IP blocks in shell driver and management stack 716.

Software components implemented in one or more layers above driver interface 736 include a DMA service 740, a network stack 742 a storage stack 744, an orchestration layer 746 and a vXPU service 748. In one non-limiting embodiment, network stack 742 employs an Open vSwitch (OVS) network stack and CNI 634. In one non-limiting embodiment, storage stack 744 employs an NVMe stack and CSI 632. vXPU service 748 is used to implement HW microservice front-ends 750.

Additional software components that are executed on the cores of SOC 706 include an FPGA infrastructure software stack 752 including a management stack 754, and a host software stack 756. In one embodiment, host software stack 756 comprises Kubernetes worker node host SW stack 624 shown in FIG. 6 and described above.

HW Microservices Deployment Models

Various deployment models may be used to deploy hardware microservices. In each of the following deployment models, the orchestrator takes the HW microservices components from a datacenter repository or from a marketplace repository or the like.

Under a first model, HW microservices are pre-provisioned ahead of time onto IPU and SOC+XPU platform/cards in the datacenter and advertised to the orchestrator, e.g., Kubernetes, as a resource (see below) or a microservice (special type with some attributes such as performance (requests/sec.), HW attributes, SLA attributes, etc. In this case, when deploying the HW microservice, the orchestrator selects and allocates the SOC and XPU resources, provisions/deploys/configures the HW microservices components and configures networking, storage and software and hardware components including the HW microservices. The orchestration selection is based on the kernel along with some on attributes or as a pre-defined sized HW microservices like with VMs, e.g., gzip_gold, gzip_silver, etc. In the case of infrastructure acceleration, the HW microservice is pre-deployed into the IPU/SOC+XPU and network or storage, for example, is configured by the orchestrator or a service running on the SOC or IPU as the application is being deployed and ready to use the HW microservices.

Under a second model, HW microservices are deployed and provisioned as part of the larger microservice application. In the case of workload acceleration, the HW microservices are pulled from a repository (including the software component and XPU bitstream/software) and are deployed by the orchestrator (e.g., Kubernetes®) into the selected SOC and FPGA combination as part of the larger application deployment by the orchestrator. The orchestrator selection is based on mapping attributes for the HW microservices with XPU and SOC HW attributes along with required networking, storage, and SOC-XPU interconnect requirements.

As discussed above, HW microservices are divided up in their two components. Under a third model, the software front-end/server component will be is stored in the repository until it is ready to be deployed by the orchestrator. The XPU bitstream/software will be pre-programmed into the XPU in the IPU/SOC-XPU in the datacenter ahead of time and advertised to the orchestrator (e.g., Kubernetes®) as an accelerated function (AF). When the orchestrator is deploying the HW microservice front-end, it selects a specific accelerated AF, the specific SOC (Xeon®-D, ARM®, RISC, ASIC, etc.) to run the front-end code and configure/connect the front-end to the backend AF.

Remote Storage for HW Microservices

Generally, there is not enough storage capacity on SoC-XPU platform for HW microservices infrastructure components (like Kubernetes® worker node components) and FPGA bitstreams, especially in multi-tenant environments with separate and different code base. Depending on the use case, local data storage might not be enough for stateful HW microservices during run-time. Under aspects of the following embodiment, NVMe-oF is leveraged to increase the amount of storage using remote storage resources, with latency similar to local storage, while reducing SoC/FPGA cost by limiting or removing local storage.

Figure 8:
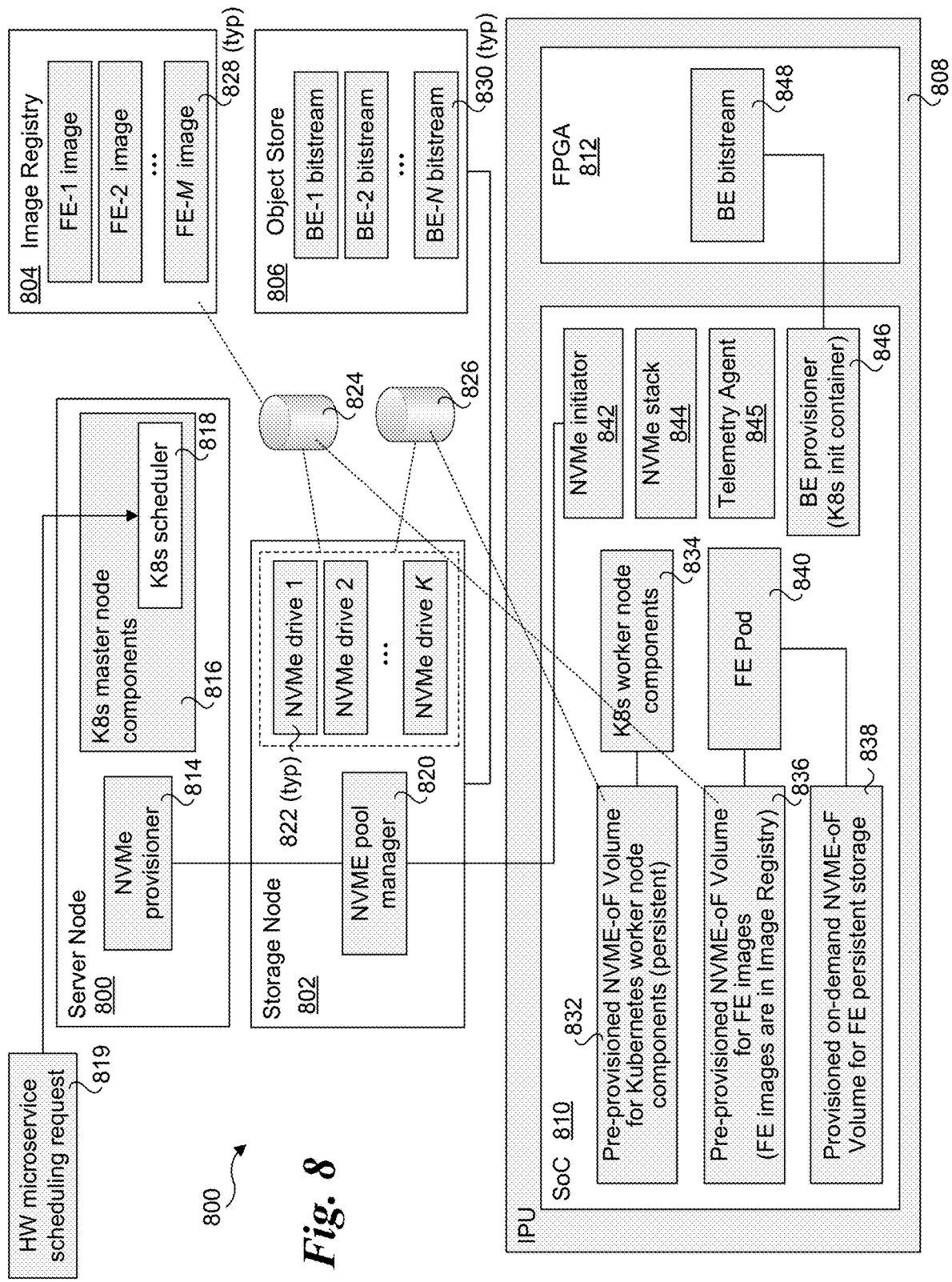
FIG. 8 is a diagram illustrating components in an exemplary system architecture.

An overview of the solution, according to one embodiment, is illustrated by architecture 800 is FIG. 8. The top-level components of the architecture include a server node 800, a storage node 802, an image registry 804, an object store 806, and an IPU 808 including an SoC 810 and an FPGA 812.

Server node 800 includes an NVMe provisioner 814, and K8s (Kubernetes®) master node components 816 including a K8s scheduler 818. NVMe provisioner 814 works with an NVMe pool manager 820 on storage node 802 to compose and decompose NVMe resources (for FE persistent storage).

K8s scheduler 818 is used to schedule HW microservice scheduling requests 819. In one embodiment, a HW microservice scheduling request contains:

1. Front End (FE) component (K8s pod)
2. FE can request NVMe-oF storage for data persistency
3. Back End (BE)—FPGA bitstream required by FE If the scheduler cannot find an IPU/FPGA with required bitstream already provisioned then the required bitstream will be provisioned as part of deployment flow.

In one embodiment, server node 800 is implemented as a physical server node (e.g., a physical server platform including one or more CPUs). A server node may also be implemented as a virtual server node comprising software executing in a virtual machine or container. In one embodiment, the physical server node includes one or more expansion slots, such as but not limited to PCIe slots or CXL slots.

In one embodiment, storage node 802 comprises an NVMe pooled storage node including a NVMe pool manager 820, and K NVMe drives 822, where K is one or more. In some embodiments, storage node 802 is implemented as a drawer or sled in a disaggregated architecture under which pooled storage resources are separated from compute resources and accessed over fabric using the NVMe-oF protocol. The storage resources for a storage node may be partitioned into multiple virtual volumes, as depicted by volumes 824 and 826.

Image registry 804 includes M HW microservice FE runtime container images 828. As illustrated, these M FE images are stored in volume 824. In one exemplary and non-limiting embodiment FE images 828 are Docker® images; however, other container runtime images may be used such as CRI-O or containerd. Object store 806 is used to store NHW microservice back-end bitstreams 830 used to program FPGA kernels.

SoC 810 is used to execute various software components, some of which are persistently stored locally on IPU 808, while other software components are accessed remotely from storage node 802. At the same time, these remotely accessed software components appear (from the viewpoint of SoC 810) to be stored locally. For illustrative purposes, various blocks representing software components are shown within SoC 810; in practice, these software components may be stored in persistent storage or memory IPU 808.

In a block 832, a NVMe-oF volume of Kubernetes® worker node components is pre-provisioned. For example, NVMe-oF volume 826 may be used to store Kubernetes® worker node components. Pre-provisioning means the NVMe-oF is pre-provisioned (set up) as a virtual local volume—from the perspective of software running on SoC 810, NVMe-oF volume 826. During runtime, IPU 808 will access NVMe-oF volume 826 over the fabric to obtain an applicable set of Kubernetes® work node components, as depicted in a block 834.

As shown in a block 836, an NVMe-oF volume of FE images (e.g., HW microservice FE images 828 image registry 804). As depicted, these FE images are stored in NVMe-oF volume 824, which is the NVMe-oF volume that is pre-provisioned in block 836 in this example.

In a block 838 a provisioned on-demand NVMe-oF volume for FE persistent storage is used to store (read/write) the data (e.g. to persist state) as needed by the FE process executing in FE pod 840.

As further shown, SoC 810 executes software comprising an NVMe initiator 842, an NVMe stack 844, and a telemetry agent 845. NVMe initiator 842 configures and attaches storage volumes to FE pod 840. It also is the data plane for data traffic between the FE components and NVMe-oF drives 822.

Software comprising a BE provisioner 846 is used to provision one or more BE bitstreams 830 in FPGA 812, as depicted by an BE bitstream 848. HW microservice back-end bitstreams 830 may be pre-provisioned or provisioned on-the-fly by BE provisioner 846

Architecture 800 may be implemented for multiple use cases. The first use case consists in pre-provisioning storage space from NVMe-oF and assigning it for the lifetime of SoC-XPU platform on which HW microservices are hosted. Such pre-provisioned space can be used to: 1) host Kubernetes® worker node components, and/or 2) host FE container images. This use case is similar to how remote storage is used for servers using NVMe-oF.

The second use case is to provision NVMe-oF storage space on demand, based on HW microservices needs. Storage space is provisioned immediately before a HW microservice is instantiated and removed after the HW microservice is deleted. By leveraging an XPU/FPGA Proxy, it will be also possible to create and attach remote storage after HW microservice is created/deployed with the first call to HW microservice. This mode is called 'lazy remote storage attachment for HW microservice'.

Additionally, Admin will be allowed to mark remote HW microservice storage as 'sticky/reusable' for a given set of HW microservices. The HW microservice that requests 'sticky/reusable' remote storage in its spec will be attached to such storage and will be able to share data with other HW microservices of the same type. Under one embodiment, Admin action will be required to remove 'sticky/reusable' storage, it won't be removed after HW microservices is removed.

The third use case is to provision security parameters, including storage encryption, transport encryption, storage authentication and authorization, etc. To support trust attestation, making sure valid/correct version of BE is deployed, the ISecL-DC-like (https://01.org/intel-secl) technology will be used. The security considerations for HW microservices, including: securing data/code at rest, secure communication between HW microservices, XPU platform attestation, etc.

For latency critical services the data stored in NVMe-oF (main storage) can be pre-fetched to local storage. The local storage on the SoC/FPGA is then treated as a buffer/cache for data stored on NVMe-oF drives. Prefetching is prediction driven with implementation dependent/delivered by the HW microservice.

Figure 9A:
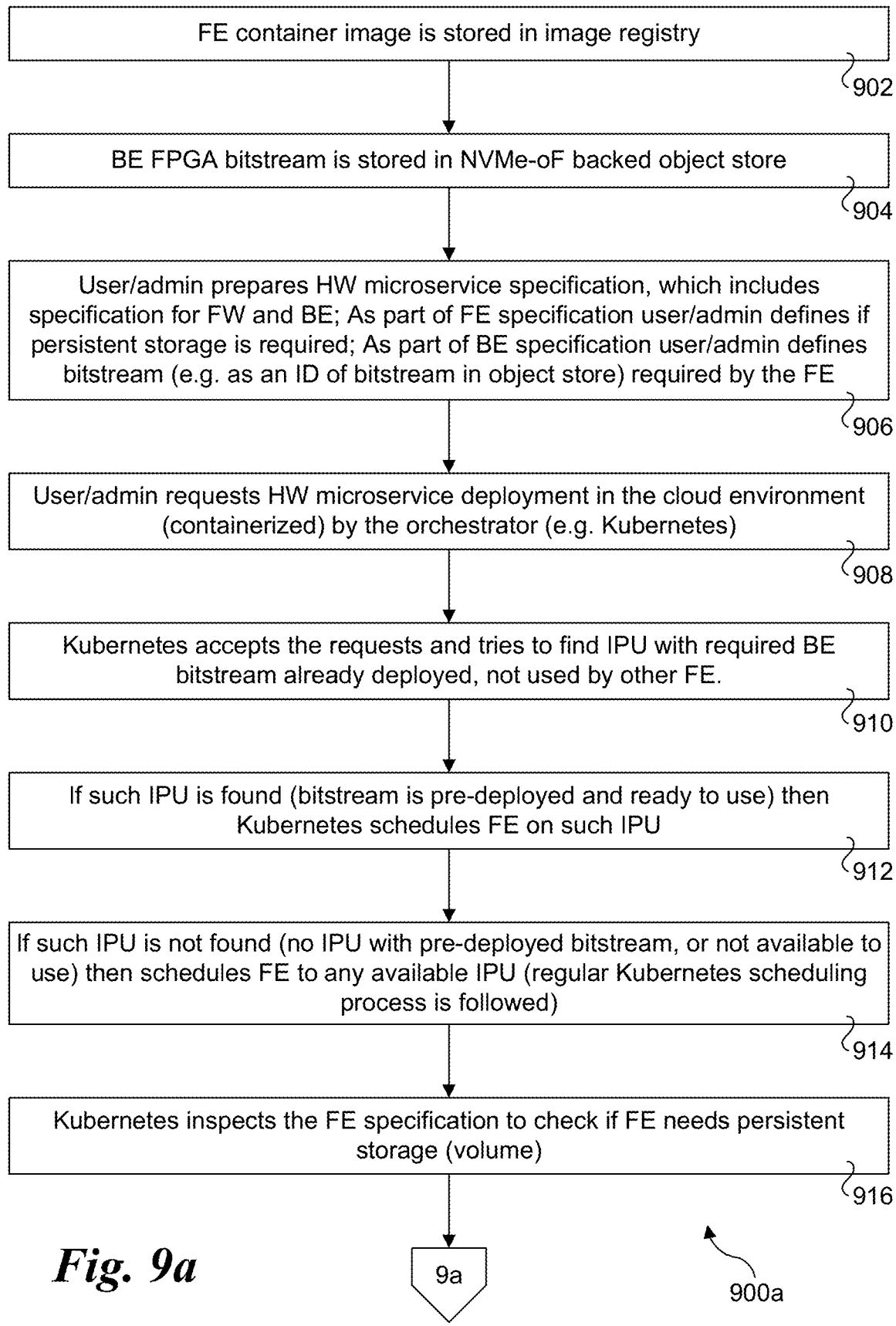
FIGS. 9a and 9b show respective flowchart portions collectively illustrating a HW microservice deployment flow using NVMe-oF, according to one embodiment.
Figure 9B:
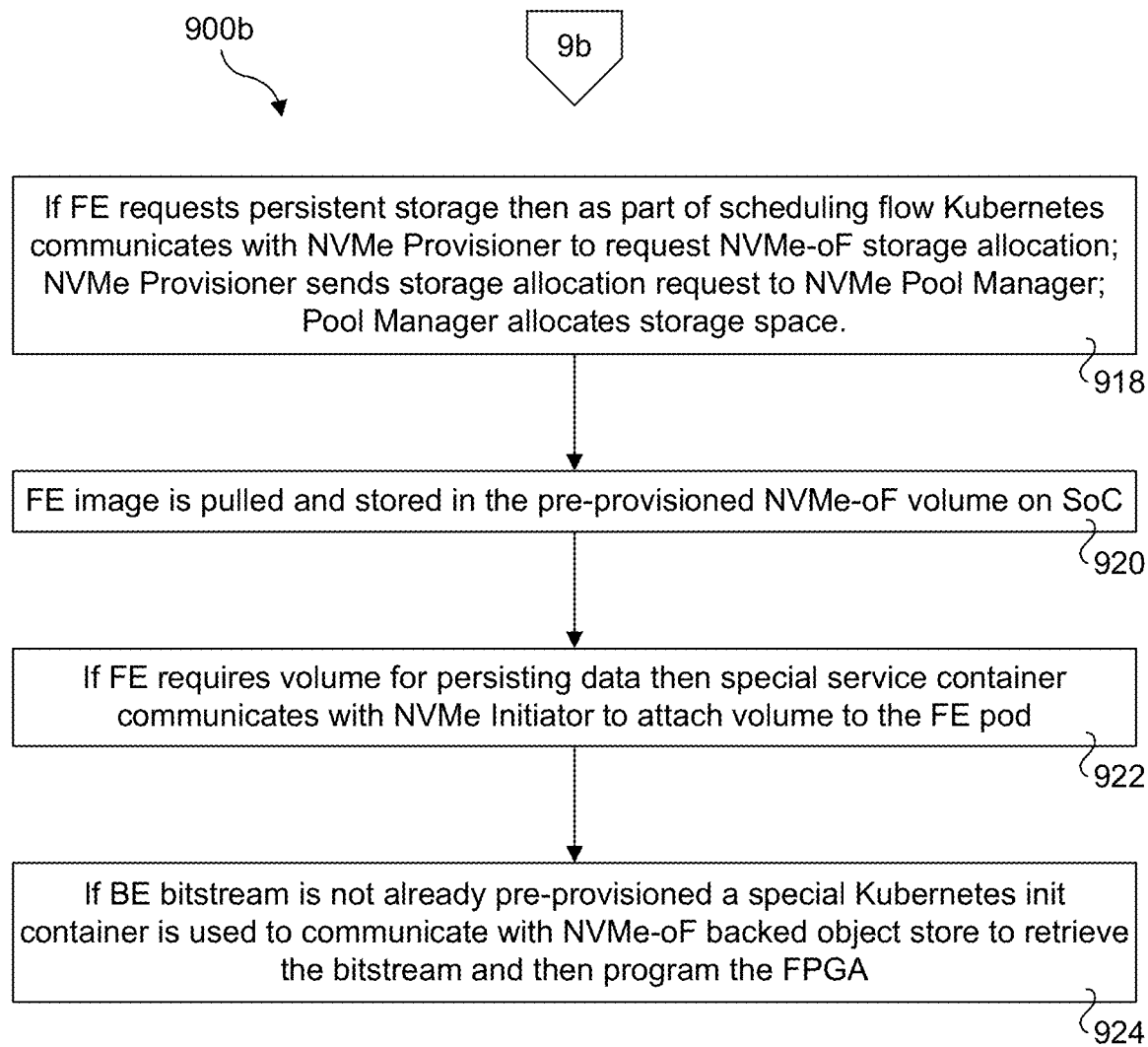

FIGS. 9*a* and 9*b* respectively show flowchart portions 900*a* and 900*b* collectively illustrating a HW microservice deployment flow using NVMe-oF, according to one embodiment. The deployment flow beings in a block 902 in which an FE container image is stored in the image registry (e.g., image registry 804). In a block 904, the BE FPGA bitstream is stored in an NVMe-oF backed object store 806.

In a block 906 a user/admin prepares a HW microservice specification, which includes an FE specification and a BE specification. As part of the FE specification, the user/admin defines if persistent storage is required (e.g., for a stateful HW microservice). As part of the BE specification the user/admin defines bitstream (e.g., as an ID of bitstream in object store) required by the FE.

In a block 908 the user/admin requests HW microservice deployment in the cloud environment (containerized) by an orchestrator. In one embodiment, the orchestrator is a Kubernetes® orchestrator). In a block 910, Kubernetes® accepts the requests and tries to find an IPU with the required BE bitstream already deployed and not currently used by other FE. As shown in a block 912, if such an IPU is found (and the BE bitstream is pre-deployed and ready to use) then Kubernetes® schedules the FE on the IPU that is found. Conversely, if such an IPU is not found (no IPU with pre-deployed bitstream, or not available to use) then the FE is scheduled to any available IPU, as shown in a block 914. Under Kubernetes®, a regular Kubernetes® scheduling process is followed.

In a block 916, Kubernetes® is used to inspect the FE specification to check if the FE needs persistent storage (volume). Continuing at a block 918 at the top of FIG. 9b, if the FE requests persistent storage then as part of scheduling flow Kubernetes® communicates with the NVMe Provisioner to request an NVMe-oF storage allocation. The NVMe Provisioner then sends a storage allocation request to the NVMe Pool Manager, following by the NVMe Pool Manager allocating the requested storage space.

In a block 920, the FE image is pulled and stored in the pre-provisioned NVMe-oF volume on the SoC. As shown in a block 922, if the FE requires a volume for persisting data then a service container is used to communicate with the NVMe Initiator to attach the volume to the FE pod. In one embodiment, the process of attaching NVMe-oF volume to FE pod is based on the solution described at https://01 dot org/kubernetes/blogs/qwang10/2019/introduction-kubernetes-storage-and-nvme-support.

As shown in a block 924, if the BE bitstream is not already pre-provisioned a Kubernetes init container is used to communicate with the NVMe-oF backed object store to retrieve the bitstream and then programs the FPGA. After this init container completes the job successfully, the FE pod can start serving requests.

Governance Model

Another important challenge in these highly distributed scenarios where HW microservices may run in multiple types of nodes or deployments is how to identify potential problems and incompatibilities and be able to roll-back in case of problems. For instance, IPU may fetch HW microservice for function X from the central repository that was earlier used. However, that new version of the function does not behave as expected in the current system. If the remote storage has capabilities to allow automatic rollbacks through, for example, versioning these problems can be mitigated. More important, storage can have capabilities to learn specific incompatibilities that are taken into account in order to provide the safer function when problems have been detected for a combination of specific SW and HW components.

A solution the foregoing problem is provided by one or more of the expansions discussed in the following paragraphs.

Under a first expansion, the remote storage includes a new versioning or cache for the HW microservices where different version of the same HW microservices are stored. Generally, each version may correspond for various versions that are deployed by infrastructure owner over the time. The new version could implement a different communication protocol, so the communication with other versions in the same service chain could be a problem. To solve this problem, the orchestrator can include an additional service chain stage to translate input/output parameters from one version to a different one. This additional stage and additional latency to perform the entire service chain can be part of the decision process to schedule or not schedule a particular HW microservice.

Along with this versioning of the HW microservice, the remote storage stores a trace or database of the various executions of the different versions of the microservice that occurred in the past and that worked or failed. Each of this stored historical data (which can be sampled) include:

1. Type of hardware appliance where the HW Microservice was running OK or failed. It may include information ranging from very simple ID to a more complex definition of the appliance.
2. (Optionally) telemetry associated with the status of the appliance when that version of the HW-microservice was executed. This is especially important in those cases that the registered microservice failed. It also may be used to potentially find a robust version of the microservice that worked when the system was under a heavily load.

In one embodiment, the remote storage includes one building block that is responsible for identifying similarities between version of a particular HW microservice and success or failure for specific appliances with specific characteristics.

Figure 10:
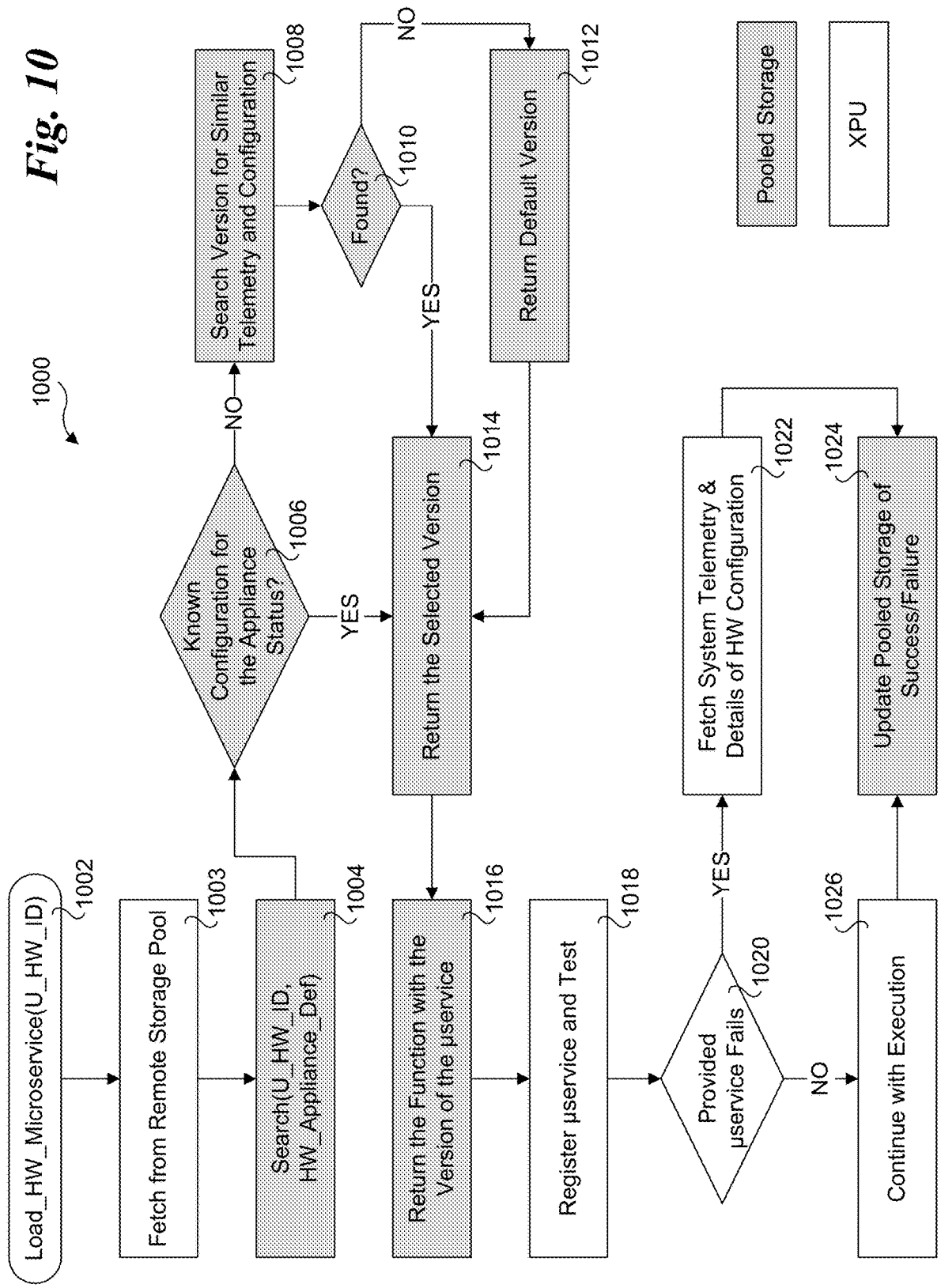
FIG. 10 is a flow diagram illustrating an advanced fetching flow with version and resiliency control, according to one embodiment

FIG. 10 shows a flow diagram 1000 illustrating an advanced fetching flow with version and resiliency control, according to one embodiment. The flow begins in a start block 1002 in which a local HW microservice is requested to be loaded. As shown, a call of Load_HW_Microservice (U_HW_ID) is used where U_HW_ID is a unique identifier for a specific HW microserve.

In a block 1004, the HW microservice is fetched (retrieved) from remote storage pool using NMFe-oF. In one embodiment, the appliance (e.g., IPU) will gather metadata around the appliance itself (e.g., platform type, CPU type, IPU type etc.) and telemetry data to help identify where the HW-microservice will be deployed.

The request to retrieve the given HW micro-services ID plus the metadata and telemetry data discussed above are sent to the pooled storage appliance. The pooled storage appliance will use the communication protocol and versioning data to identify if the latest version of U_ID is available and whether it has shown any problems. If it has not shown any problems, the last version of U_ID will be provided. Otherwise, the pooled storage will search for the version of U_ID that is known to provide the right behavior in view of the metadata and telemetry data. In case there is exact version of U_ID (e.g., because the version of metadata used is only based on appliance type) is found, the version will be provided. Otherwise, the trace or database of the different versions of the HW microservice will be used to identify a (more) similar version, and that version will be returned Logic for implementing the foregoing functionality is shown in blocks 1004, 1008, 1012, and 1014 and decision blocks 1006 and 1008. In block 1004, the HW microservice is searched using the U_HW_ID and a hardware appliance (e.g., IPU) definition (HW_Appliance_Def). In a decision block 1006 a determined is made to whether there is a known configuration for the appliance status. If the answer is YES, the logic proceeds to block 1014, which returns the version that is found matching the hardware appliance definition and HW microservice type to the appliance in a block 1016 If the answer is NO, the logic proceeds to block 1008 in which a search for an appliance with a version having similar telemetry and configuration is performed. As shown in decision block 1010, if an appliance is found (YES), an identifier of the appliance is returned as the selected version in block 1014. If the answer to decision block 1010 is NO (not found), the logic proceeds to block 1012 in which a default version of the appliance is forwarded to block 1014 to be returned.

Once the U_HW_ID is returned to the appliance in block 1016, the microservice is registered by the XPU (e.g., FPGA) in a block 1018 and the appliance can test and it with a small benchmark (e.g., a function) to verify whether the provided microservice works. In a decision block 1010 a determination is made whether the provided microservice works or fails. Generally, a microservice may not work for one or more reasons, such as performance, bandwidth, etc. If it fails, system telemetry and details of the hardware configuration a fetched by the XPU in a block 1022 and provided to the pooled storage to update the trace information or database that the provided microservice failed. In this case, the operations for the flow can be repeated from start block 1002. If the provided microservice does not fail, execution is continued in a block 1026 and the pooled storage trace information or database is updated in block 1024 to indicate success of the provided microservice.

Quality of Service

In some embodiments, part of the HW microservice definition may be labeled with a Quality-of-Service (QoS) class. In one embodiment, the following three QoS classes (Basic, Standard, and Premium) are defined; however, it will be recognized by those having skill in the art that more or less QoS classes may be defined.

Under the Basic QoS class, no checks are done for compatibility between the HW microservice software and the HW platform. In case these two are incompatible, the HW microservice deployment will fail and will be retried by the orchestration software. No additional data (telemetry, logs) are collected.

Likewise, under the Standard QoS class, no checks are done for compatibility between the HW microservice software and the HW platform. As before, the orchestration software will re-schedule the microservice if the deployment fails; however, under the Standard QoS class a telemetry agent collects the telemetry and log data. This data is then placed in remote storage for further automatic or manual analysis.

Under the Premium QoS class, the telemetry agent selects the best version of SW microservice for the deployment platform by communicating with remote storage and retrieving the SW version that is proved to work on the HW platform. To support this, an agent on the remote storage is used to continuously/periodically analyze stored data (e.g. failure logs and performance data) and map SW microservices versions to HW platforms. Once a microservice software is requested for a HW platform, that remote storage agent responds based on the current mapping. If no matching SW version is found, this information is returned to telemetry agent which can fail the deployment process early such that no image is retrieved (saving network bandwidth and time).

The use of remote storage accessed over a fabric or network and using a protocol such as NVMe-oF may also support differentiated storage based on cost. For example, as part of the HW microservice definition, a desired storage cost can be added. In one embodiment, the options include Local storage only, Local storage as cache, and Remote storage only.

Under Local storage only, the HW microservice data will be placed on local storage (only). Attachment of remote storage to the HW microservice will be blocked by the telemetry agent.

Under Local storage as cache, the HW microservice data will be placed on remote storage; however, the telemetry agent will be able to retrieve the data from remote storage and place the retrieved data in local storage for HW microservice use, with the amount of retrieved (and locally cached) data being regulated by the telemetry agent configuration for the HW microservice. The telemetry agent can proactively retrieve data from remote storage so that when those data are needed by HW microservice such data is available on local storage (resulting in lower latency for data access and wider bandwidth compared to remote storage). The telemetry agent can also retrieve data from remote storage on demand, as requested by the HW microservice.

Under Remote storage only, the HW microservice data will be placed on remote storage (only). The telemetry agent will block placing data by the HW microservice on the local storage.

The foregoing storage options may also support security and performance requirements. For example, if the system owner wants to have full control over data processed and stored by the HW microservice, the owner can block local storage for such microservice. Similarly storing all data on remote storage can help in enforcement of policy rules. Using local vs remote storage can be associated with performance benefits/penalties (latency and bandwidth). Hence, for example, a HW microservice owner can choose to use only remote storage (which can be associated with lower billing), while sacrificing some level of performance. If a higher QoS class is needed, the HW microservice own can choose to employ Local storage as cache or Local storage only.

In some embodiments, fingerprinting from past usage for microservices and accelerators are used to determine placement of HW microservices. This allows for predicting optimal placement and future state. In one embodiment, a database with previous fingerprinting traces available in the datacenter and serving as input to the orchestrator is used. Telemetry data that might be considered for fingerprinting include resource usage, error, thermal, connectivity metric between FPGA and SOC, load, BW, latency, etc. In some embodiments, HW microservices (on SOC+XPU) are disaggregated resources in the datacenter so they should be scheduled and provisioned as a unit.

Generally, HW microservices are described as a resource and not as a list of resources that compose the HW microservice. For example, the HW microservice may be stored in a gzip file or the like, including metadata (e.g., a metadata file). The metadata describing such HW microservices for the user should include functionality, such as compression/gzip algorithm, and KPIs, such as compression rate.

Generally, HW microservices may be running in the same domain or an independent domain from the host CPU. Because of the tight coupling between the host code and the XPU code/FPGA kernel, they should be considered as one unit (can be viewed, for example, as one virtual Kubernetes® pod for a container-based implementation) that is deployed/provisioned/run as a unit.

The scheduling a microservice application composed of both SW and HW microservices can be done either through invoking HW microservices under resources in, for example, the deployment manifest or by defining the HW microservices. The interfaces should be aligned with popular Cloud Native Standards, such as but not limited to Kubernetes.

This new "resource," which defines a combination of resources enables the orchestrator to perform scheduling at the cluster level rather than at the resource level ensuring that the users do not have to deal with the individual HW resources that are composing a HW microservices and can just focus on the functionality, SLA/performance or other requirements of the HW microservice they need.

Exemplary IPU Card

Figure 11:
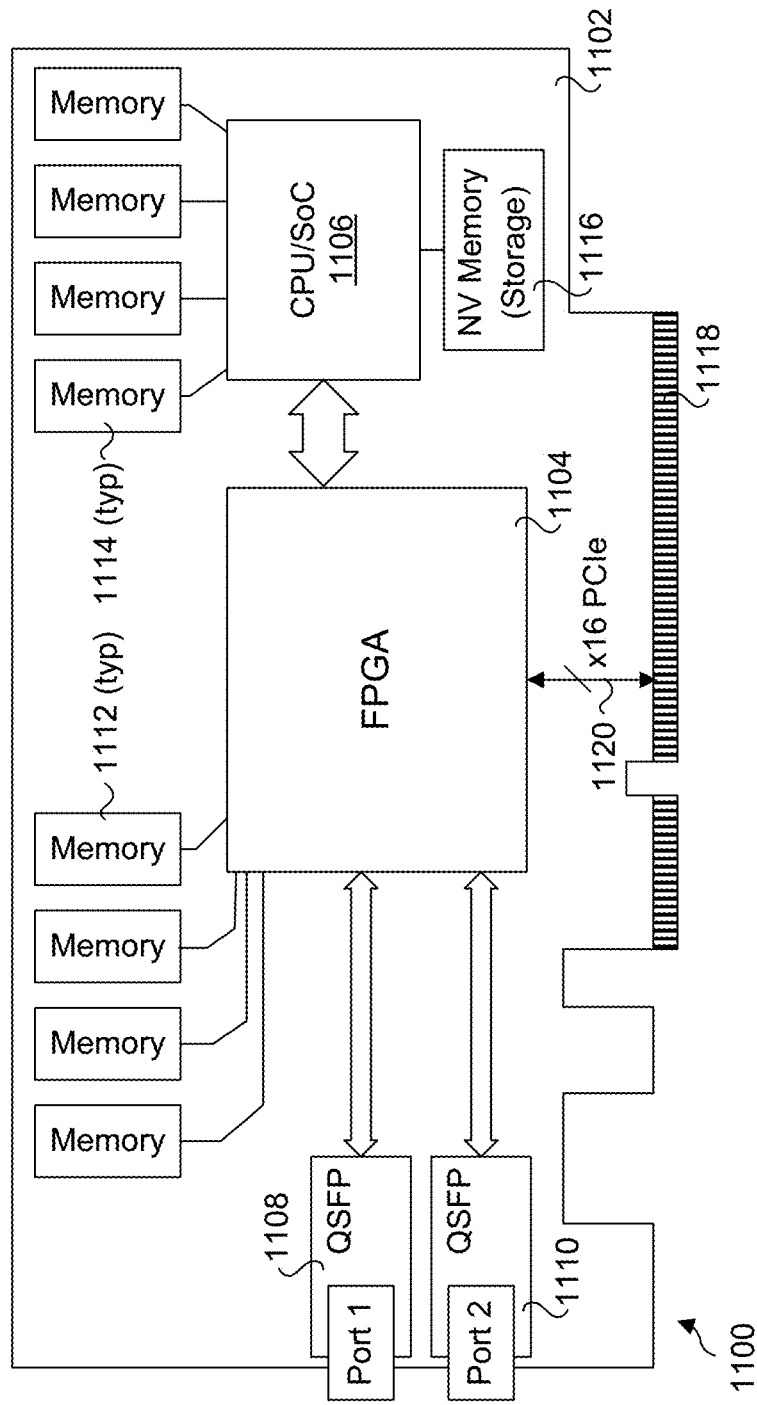
FIG. 11 is a diagram of an exemplary IPU card, according to one embodiment.

FIG. 11 shows one embodiment of IPU 1100 comprising a PCIe card including a circuit board 1102 having a PCIe edge connector to which various integrated circuit (IC) chips are mounted. The IC chips include an FPGA 1104, a CPU/SOC 1106, a pair of QSFP modules 1108 and 1110, memory (e.g., DDR4 or DDR5 DRAM) chips 1112 and 1114, and non-volatile memory 1116 used for local persistent storage. FPGA 1104 includes a PCIe interface (not shown) connected to a PCIe edge connector 1118 via avPCIe 1120 which in this example is 16 lanes. The various functions and operations performed by embodiments of IPUs described and illustrated herein may be implemented by programmed logic in FPGA 1104 and/or execution of software on CPU/SOC 1106. As discussed above, FPGA 1104 may include logic that is pre-programmed (e.g., by a manufacturing) and/or logic that is programmed in the field (e.g., using FPGA bitstreams and the like). For example, logic in FPGA 1104 may be programmed by a host CPU for a platform in which IPU 1100 is installed. IPU 1100 may also include other interfaces (not shown) that may be used to program logic in FPGA 1104.

CPU/SOC 1106 employs a System on a Chip including multiple processor cores. Various CPU/processor architectures may be used, including but not limited to x86, ARM®, and RISC architectures. In one non-limiting example, CPU/SOC 806 comprises an Intel® Xeon®-D processor. Software executed on the processor cores may be loaded into memory 1114, either from a storage device (not shown), for a host, or received over a network coupled to QSFP module 1108 or QSFP module 1110.

Disaggregated Architectures

Figures 12A, 12B:
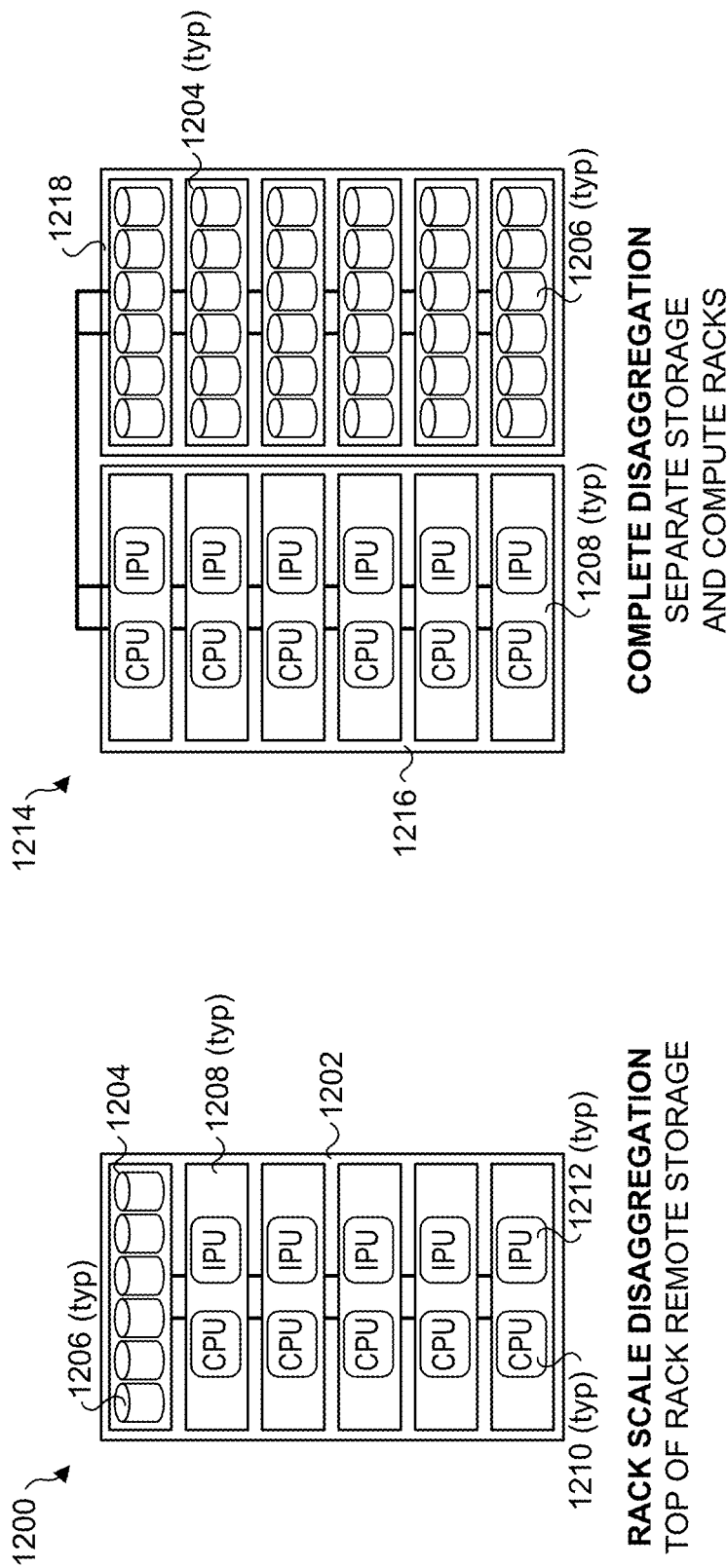
FIG. 12a is a diagram illustrating a rack in a disaggregated Rack Scale architecture.
FIG. 12b is a diagram illustrating a complete disaggregation architecture.

FIGS. 12a and 12b shows two exemplary and non-limiting examples of disaggregated architecture that may be employed in a data center environment or the like. Under the Rack Scale disaggregation architecture 1200 of FIG. 12, multiple chassis, drawers, sleds, etc. are installed in a rack 1202. This architecture includes a Top of Rack (ToR) remote storage node 1204 including a plurality of storage devices 1206. Multiple servers 1208 including a CPU 1210 and one or more IPUs 1212 (only one of which is shown for simplicity) are installed in respective slots in rack 1202 below ToR remote storage node 1204. It is noted that it is common to employ a Top of Rack switch (not shown) in a rack, which may be implemented at the top of the rack, as the name implies. When a ToR switch is present, remote storage node 1204 may occupy the first slot below the ToR switch. Alternatively, a remote storage node may be implemented using any slot in a rack. Servers 1208 and remote storage node 1204 are communicatively coupled via a fabric or network including applicable switches (not shown).

Under the complete disaggregation architecture 1214 shown in FIG. 12b separate compute and storage racks 1216 and 1218 are employed. Compute rack 1216 is populated with a plurality of servers 1208. Meanwhile, a plurality of remote storage nodes 1204 are installed in storage rack 1218. In one embodiment, each of compute rack 1216 and storage rack 1218 would include a ToR switch (not shown). As before, servers 1208 and remote storage nodes 1204 are communicatively coupled via a fabric or network including applicable switches (not shown).

The HW microservice solutions described and illustrated herein provide numerous advantages over current approaches. For example, the HW microservices solutions encapsulate a novel approach of optimizing and processing "sharing" of an XPU or XPUs between multiple microservices through "smart" multiplexing of the XPU between different predetermined applications. This novel approach is the first built around hardware microservices sharing of the XPU through multiplexing on the same acceleration function, on multiple acceleration functions running concurrently on the same XPU or multiple XPUs or on-demand reprovisioning of accelerated functions based on the microservices' SLO.

With knowledge of specific acceleration functions, the XPU proxy controller predicts, programs, and schedules the XPU based on pre-existing characteristics of the functions and feedback from the microservices and the accelerated functions. The XPU proxy controller predicts HW microservices future behaviors based on microservice and accelerated functions telemetry and feedback data to meet the microservices SLO including personality change of XPU. The XPU proxy controller inspects requests (e.g., packet inspection) from a client or microservice "client" and selects an optimal processing entity (software, XPU, ASIC) for the HW microservices based on monitored performance telemetry and health to meet microservices' SLO.

Embodiments of the HW microservices reconfigure kernels personality based on power, bandwidth, and better throughput to meet microservices SLOs. In addition, the HW microservices automates kernel selections based on microservice and accelerated function feedback to meet microservices SLOs.

Automated as well as microservice-driven and accelerated function-driven solutions are provided. For example, the HW microservice server front-end provisions and reprovisions the XPU bits to make the XPU take on a new personality to support better throughput of the incoming traffic, e.g., if the amount of compression requests coming is low but encryption requests are high the HW microservice server can reprogram one or more of the FPGA slots with the encryption kernel to support the thought put as well as SLA/SLO for that HW microservice. This applies to other XPUS as well such as vXPU.

In accordance with further aspects of the solutions, the HW microservices treat the FPGA like a general processor as the FPGA can be reprogrammed/reconfigured and managed to fit different personalities. The HW microservices can be chained to support efficient pipelining of tasks and data movement. The ingress network traffic can go directly to the FPGA/XPU accelerated function (via our FPGA/XPU Proxy or directly) for processing and the resulting egress traffic is returned directly to the datacenter network without involving the CPU. The solutions enable HW microservice service chaining and pipelining over Ethernet or other interconnects, such as CXL/Glueless configurations of XPUs.

A pool of FPGAs/XPUs can be dynamically assigned on a per slot/per AFU/and shared to composed HW microservices. The HW microservices optimize IPU acceleration through its flexibility and architecture, e.g., in the pipeline for storage and network support.

In the case of IPUs, HW microservices can be customized optimize resources on-demand/real-time and allowed for more and/or wider PCIe/CXL lanes and other interconnects between processors and devices including custom protocols, customizations of network traffic, etc., leading to more bandwidth and lower latency between the processors and the devices.

In accordance with another aspect, when FPGAs are implemented as XPUs, they can be used as root of trust to control boot sequence and store keys and certifications, which is often a problem in software-only environments.

Generally, an SOC as it is deployed on SOC+XPU platform or in IPU may comprise a lower-power SOC (relative to a host compute CPU) and usually is deployed in its own domain in order to not use or impede or cause a security issue workload running in the host compute CPU.

In one aspect, the HW microservice may access memory and/or storage resources attached to the SOC, e.g., local disk, memory, etc. as well as remote storage through NVMe over Fabric (NVMe-oF), etc.

Generally, a HW microservice is one resource and as such is not an aggregation of resources and software. It is equivalent to a device, a CPU, an XPU, etc. A customer using, for example, the managed Kubernetes service does not know what the HW microservice is running on, just its SLA/functionality/algorithm and KPIs.

When deployed under the first model presented above, the server front-end of the HW microservice can provision and reprovision the XPU bits to make the XPU take on a new personality to support better throughput of the incoming traffic, e.g., if the amount of compression requests coming is low but encryption requests are high the HW microservice server can reprogram one or more of the FPGA slots with the encryption kernel to support the thought put as well as SLA/SLO for that HW microservice. This applies to other XPUs as well such as vXPU.

HW microservices can be or can monitor and manage the load and carry out remediation steps on the XPU based on telemetry received and feedback loops including AI (Artificial Intelligence) algorithms to support meeting SLO/SLAs. For example, if an XPU temperature gets too high, the XPU could be throttled and/or feedback could be sent to the main service/load-balancer to indicate that this HW microservice has reached its limit and to stop sending as many requests. Once the temperature is within the normal range, the HW microservice could be advertised as healthy to the rest of the environment and stop throttling the XPU, for example.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, FPGAs, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A platform configured to be deployed in a network environment including a remote storage node coupled to a fabric, comprising:
    a circuit board to which multiple components are operatively coupled, including,
        a System On Chip (SOC), having a plurality of cores;
        at least one fabric interface configured to be coupled to the fabric;
        memory, in which software to be executed on one or more of the plurality of cores in the SOC is stored, the software including software code configured to pre-provision storage space on the remote storage node and assign the storage space to the platform, wherein the pre-provisioned storage space includes one or more container images to be implemented as one or more hardware (HW) microservice front-ends; and
        an Other Processing Unit (XPU), communicatively coupled to the SOC via interconnect circuitry in the circuit board and configured to implement one or more accelerator functions used to accelerate HW microservice backend operations that are offloaded from the one or more HW microservice front-ends.

2. The platform of claim 1, wherein the remote storage node includes a plurality of NVMe (Non-Volatile Memory Express) drives, and the platform is configured to employ an NVMe over fabric (NVMe-oF) protocol to pre-provision the storage space on the remote storage node.

3. The platform of claim 2, wherein the storage space is pre-provisioned as one or more NVMe-oF volumes including a pre-provisioned NVMe-oF volume containing a plurality of HW microservice container images.

4. The platform of claim 2, wherein the storage space is pre-provisioned as one or more NVMe-oF volumes including a pre-provisioned NVMe-oF volume containing worker node components.

5. The platform of claim 4, wherein a portion of the memory comprises non-volatile memory implemented as persistent storage, and wherein execution of the software code further enables the platform to:
    retrieve worker node components from the pre-provisioned NVMe-oF volume containing worker node components; and
    persistently store the worker node components that are retrieved in the non-volatile memory.

6. The platform of claim 1, wherein the XPU comprises a Field Programmable Gate Array (FPGA), and the one or more accelerated functions comprise FPGA kernels.

7. The platform of claim 6, wherein execution of the software further enables to platform to:
    retrieve an FPGA kernel bitstream from the remote storage node;
    provision an accelerator function in the FPGA using the FPGA kernel bitstream to program the FPGA to accelerate HW microservice backend operations for at least one HW microservice.

8. The platform of claim 1, wherein the platform comprises an infrastructure processing unit (IPU).

9. The platform of claim 8, wherein the XPU comprises a Field Programmable Gate Array (FPGA), wherein the IPU comprises a Peripheral Component Interconnect Express (PCIe) card, and the FPGA is configured to implement one or more PCIe interfaces.

10. The platform of claim 1, wherein the platform is configured to be installed in a server including a central processing unit (CPU) that is communicatively coupled to at least one of the SOC and XPU when the platform is installed in the server.

11. A method implemented on a platform configured to be deployed in a data center including a remote storage node coupled to a fabric, the platform including a System on Chip (SOC) having a plurality of cores and operatively coupled to a circuit board and communicatively coupled to an other processing unit (XPU) operatively coupled to the circuit board, the method comprising:
    communicatively coupling the platform to the fabric; and
    pre-provisioning storage space on the remote storage node and assigning the storage space to the platform, wherein the pre-provisioned storage space includes one or more container images to be implemented as one or more hardware (HW) microservice front-ends on the platform.

12. The method of claim 11, wherein the remote storage node includes a plurality of NVMe (Non-Volatile Memory Express) drives, further comprising:
    employing an NVMe over fabric (NVMe-oF) protocol to pre-provision the storage space on the remote storage node,
    wherein the storage space is pre-provisioned as one or more NVMe-oF volumes including a pre-provisioned NVMe-oF volume containing a plurality of HW microservice front-end container images.

13. The method of claim 12, further comprising:
pre-provisioning an NVMe-oF volume containing worker node components;
retrieving worker node components from the pre-provisioned NVMe-oF volume containing worker node components; and
persistently storing the worker node components that are retrieved in non-volatile storage on the platform.

14. The method of claim 12, further comprising:
searching for a HW microservice front-end container image among the plurality of HW microservice front-end container images stored on the remote storage node;
receiving, via the remote storage nodes, a HW microservice front-end container image the is provided by the remote storage node;
testing the HW microservice front-end container image that is provided; and
determining whether the provided HW microservice front-end container image successfully works or fails.

15. The method of claim 11, wherein the XPU comprises a Field Programmable Gate Array (FPGA), and the one or more accelerated functions comprise FPGA kernels, further comprising:
retrieving an FPGA kernel bitstream from the remote storage node;
provision an accelerator function in the FPGA using the FPGA kernel bitstream to program the FPGA to accelerate HW microservice backend operations for at least one HW microservice.

16. A system comprising:
a fabric or network;
a remote storage node, coupled to the fabric and including a plurality of storage devices;
a server, including,
one or more central processing units (CPUs); and
an infrastructure processing unit (IPU) comprising,
a circuit board to which multiple components are operatively coupled, including,
a System On Chip (SOC), having a plurality of cores;
at least one fabric interface coupled to the fabric or network;
memory, in which software to be executed on one or more of the plurality of cores in the SOC is stored, the software including software code configured to pre-provision storage space on the remote storage node and assign the storage space to the platform, wherein the pre-provisioned storage space includes one or more container images to be implemented as one or more hardware (HW) microservice front-ends; and
a Field Programmable Gate Array (FPGA), communicatively coupled to the SOC via interconnect circuitry in the circuit board and configured to implement one or more accelerator functions used to accelerate HW microservice backend operations that are offloaded from the one or more HW microservice front-ends.

17. The system of claim 16, wherein the remote storage node includes a plurality of NVMe (Non-Volatile Memory Express) drives, and the platform is configured to employ an NVMe over fabric (NVMe-oF) protocol to pre-provision the storage space on the remote storage node.

18. The system of claim 17, wherein the storage space is pre-provisioned as one or more NVMe-oF volumes including a pre-provisioned NVMe-oF volume containing a plurality of HW microservice container images and including a pre-provisioned NVMe-oF volume containing worker node components.

19. The system of claim 18, wherein a portion of the memory in the IPU comprises non-volatile memory implemented as persistent storage, and wherein execution of the software code further enables the IPU to:
retrieve worker node components from the pre-provisioned NVMe-oF volume containing worker node components; and
persistently store the worker node components that are retrieved in the non-volatile memory.

20. The system of claim 16, wherein the remote storage node is installed in a first rack in a datacenter, the server is installed in a second rack in the data center, and the first rack is connected to the second rack via the fabric or network.

\* \* \* \* \*